United States Patent
Hennig et al.

(10) Patent No.: US 10,933,703 B2
(45) Date of Patent: Mar. 2, 2021

(54) PRESSURE EQUALIZATION VALVE ASSEMBLY

(71) Applicant: Equalaire Systems, Inc., Corpus Christi, TX (US)

(72) Inventors: Mark Kevin Hennig, Corpus Christi, TX (US); Dane Henry, Windcrest, TX (US); James Raymond Snider, Beeville, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 134 days.

(21) Appl. No.: 16/083,420

(22) PCT Filed: Mar. 9, 2017

(86) PCT No.: PCT/US2017/021696
§ 371 (c)(1),
(2) Date: Sep. 7, 2018

(87) PCT Pub. No.: WO2017/156351
PCT Pub. Date: Sep. 14, 2017

(65) Prior Publication Data
US 2019/0077203 A1    Mar. 14, 2019

Related U.S. Application Data
(60) Provisional application No. 62/447,827, filed on Jan. 18, 2017, provisional application No. 62/447,831, (Continued)

(51) Int. Cl.
*B60C 23/00* (2006.01)
*B60C 29/06* (2006.01)
*B60C 29/00* (2006.01)

(52) U.S. Cl.
CPC .......... *B60C 23/003* (2013.01); *B60C 23/007* (2013.01); *B60C 29/007* (2013.01); *B60C 29/066* (2013.01); *B60C 2200/06* (2013.01)

(58) Field of Classification Search
CPC . B60C 23/003; Y10T 137/3631; F16K 15/20; F16K 7/16; F16K 7/14; F16K 31/1264
(Continued)

(56) References Cited

U.S. PATENT DOCUMENTS

| | | | | |
|---|---|---|---|---|
| 2,121,549 A | * | 6/1938 | McNeal | F16K 7/14 137/496 |
| 2,251,713 A | | 8/1941 | Meiser | |

(Continued)

FOREIGN PATENT DOCUMENTS

WO    2015191621 A1    12/2015

OTHER PUBLICATIONS

International Search Report and Written Opinion issued in PCT/US2017/021696 dated Jun. 1, 2017 (18 pages).
(Continued)

*Primary Examiner* — Reinaldo Sanchez-Medina
*Assistant Examiner* — Nicole Gardner
(74) *Attorney, Agent, or Firm* — Pizarro Allen PC

(57) ABSTRACT

A pressure equalization valve assembly may include a valve body forming fluid chamber configured to receive pressurized fluid from a fluid pressure source, a first port configured for sealed communication with a first vehicle tire, and a second port configured for sealed communication with a second vehicle tire; a first one-way valve disposed in the valve body between the fluid chamber and the first port so as to allow one-way fluid communication from the fluid chamber to the first port when the first one-way valve opens; a second one-way valve disposed in the valve body between the fluid chamber and the second port so as to allow one-way
(Continued)

fluid communication from the fluid chamber to the second port when the second one-way valve opens; and a two-way valve disposed in the valve body between the first port and the second port so as to allow two-way fluid communication between the first port and the second port when the two-way valve opens.

24 Claims, 22 Drawing Sheets

Related U.S. Application Data filed on Jan. 18, 2017, provisional application No. 62/305,793, filed on Mar. 9, 2016.

(58) Field of Classification Search
USPC .......................................................... 251/331
See application file for complete search history.

(56) References Cited

U.S. PATENT DOCUMENTS

| | | | |
|---|---|---|---|
| 2,633,148 A | | 3/1953 | Kelly |
| 3,511,270 A | * | 5/1970 | Fehrenbach ....... G05D 16/0658 137/510 |
| 4,418,737 A | | 12/1983 | Goodell et al. |
| 4,893,664 A | * | 1/1990 | Oltean ................. B60C 23/003 152/416 |
| 5,158,122 A | | 10/1992 | Moffett |
| 5,398,743 A | * | 3/1995 | Bartos ................. B60C 23/003 137/225 |
| 5,560,792 A | | 10/1996 | Anthony |
| 5,807,445 A | | 9/1998 | Hoffman |
| 6,401,743 B1 | | 6/2002 | Naedler |
| 7,530,379 B1 | | 5/2009 | Becker et al. |
| 7,669,465 B2 | | 3/2010 | Becker |
| 8,973,633 B2 | | 3/2015 | Wilson et al. |
| 9,132,704 B2 | | 9/2015 | Wilson et al. |
| 2006/0179929 A1 | | 8/2006 | Becker |
| 2012/0024445 A1 | | 2/2012 | Wilson et al. |
| 2013/0146193 A1 | | 6/2013 | Stephenson |
| 2015/0096655 A1 | | 4/2015 | Koulinitch et al. |
| 2015/0107742 A1 | | 4/2015 | Knapke et al. |
| 2015/0136270 A1 | | 5/2015 | Keane |
| 2015/0144222 A1 | | 5/2015 | Wilson et al. |
| 2015/0165846 A1 | | 6/2015 | Sidders et al. |
| 2015/0174972 A1 | | 6/2015 | Zhou et al. |
| 2015/0202931 A1 | | 7/2015 | Honig |
| 2015/0258863 A1 | | 9/2015 | Gillen |
| 2017/0120696 A1 | * | 5/2017 | Henry .................... F16K 15/20 |
| 2017/0368896 A1 | | 12/2017 | Balistreri et al. |
| 2018/0072112 A1 | | 3/2018 | Lee |

OTHER PUBLICATIONS

International Preliminary Report on Patentability issued in PCT/US2017/021696 and dated Sep. 11, 2018 (11 pages).
File History for U.S. Appl. No. 13/194,617 (287 pages).
Description of product available for sale by Link called Cat's Eye available at https://www.linkmfg.com/products/trailer-suspensions-products/cats-eye/ dated 2018 (1 page).

* cited by examiner

PRESSURE EQUALIZATION VALVE ASSEMBLY

CROSS-REFERENCE TO RELATED APPLICATION

This application is a national stage entry of PCT/US2017/021696 entitled "Pressure Equalization Valve Assembly" filed Mar. 9, 2017, which claims priority to U.S. Provisional Patent Application No. 62/305,793 entitled "Pressure Equalization Valve Assembly" filed Mar. 9, 2016, U.S. Provisional Patent Application No. 62/447,827 entitled "Tire Equalization Valve" filed Jan. 18, 2017, and U.S. Provisional Patent Application No. 62/447,831 entitled "Tire Equalization Valve" filed Jan. 18, 2017, which are hereby entirely incorporated herein by reference.

FIELD

The disclosed method and apparatus generally relate to valve assemblies in the field of tire inflation and deflation systems.

BACKGROUND

There exists a need for a method and apparatus for a valve assembly that allows for pressure equalization between two or more vehicle tires, and particularly between two vehicle tires that are mechanically coupled, such as dual-tire configurations used by heavy-duty vehicles in which two tires are mounted on a single wheel end assembly.

SUMMARY

A valve assembly comprising a valve body forming fluid chamber configured to receive pressurized fluid from a fluid pressure source, a first port configured for sealed communication with a first vehicle tire, and a second port configured for sealed communication with a second vehicle tire; a first one-way valve disposed in the valve body between the fluid chamber and the first port so as to allow one-way fluid communication from the fluid chamber to the first port when the first one-way valve opens; a second one-way valve disposed in the valve body between the fluid chamber and the second port so as to allow one-way fluid communication from the fluid chamber to the second port when the second one-way valve opens; and a two-way valve disposed in the valve body between the first port and the second port so as to allow two-way fluid communication between the first port and the second port when the two-way valve opens.

DETAILED DESCRIPTION

Figure 1:
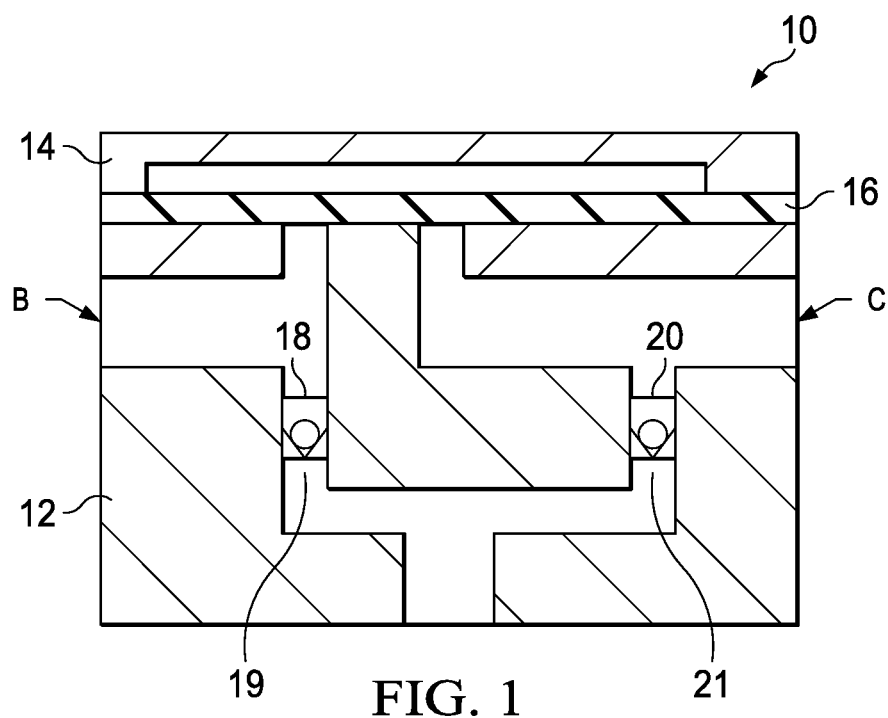
FIG. 1 illustrates one embodiment of a pressure equalization valve assembly comprising a two-way valve and a plurality of one-way valves.

A vehicle tire inflation system may include a valve assembly to allow for inflation and deflation of a vehicle tire. As is by now known in the art, a vehicle tire inflation system may comprise a fluid pressure source, such as a fluid compressor or tank of compressed air, in sealed fluid communication with one or more vehicle tires through a rotary union.

A valve assembly may be provided as part of the tire inflation system, whether as a separate component or as part of a rotary union assembly. As may be seen in the embodiment of FIG. 1, a valve assembly 10 may comprise a lower block 12 and an upper block 14. A diaphragm 16 may be disposed between the lower block and the upper block. One-way valve 18 may be disposed in fluid channel 19. One-way valve 20 may be disposed in fluid channel 21. One-way valves 18, 20 may comprise a flexible material and configuration, such as an elastomeric duck-bill valve, or may comprise any other suitable one-way valve, such as a SCHRADER® valve (with or without a biasing spring), or a ball-and-seat valve (such as a LEE® 558 Series forward check valve), poppet valve, or other check valve. The one-way valves may or may not include springs or other mechanisms to bias the valve to a closed position. A first vehicle tire (not shown) may be disposed in sealed fluid communication with port B, and a second vehicle tire (not shown) may be disposed in sealed fluid communication with port C.

The valve assembly upper block and lower block may be assembled using conventional fasteners, such as threaded fasteners, locks, clamps, or may be joined by any suitable means. The diaphragm may be retained between the upper and lower block by friction fit, clamp ring, or any other suitable means. In the disclosed embodiments, the diaphragm may comprise an elastomeric sheet clamped between the upper block and the lower block of the valve assembly, or otherwise disposed in the valve assembly. In other embodiments, a valve assembly may comprise a unitary block having a diaphragm, fluid channels and valves disposed therein as described herein.

Figure 2:
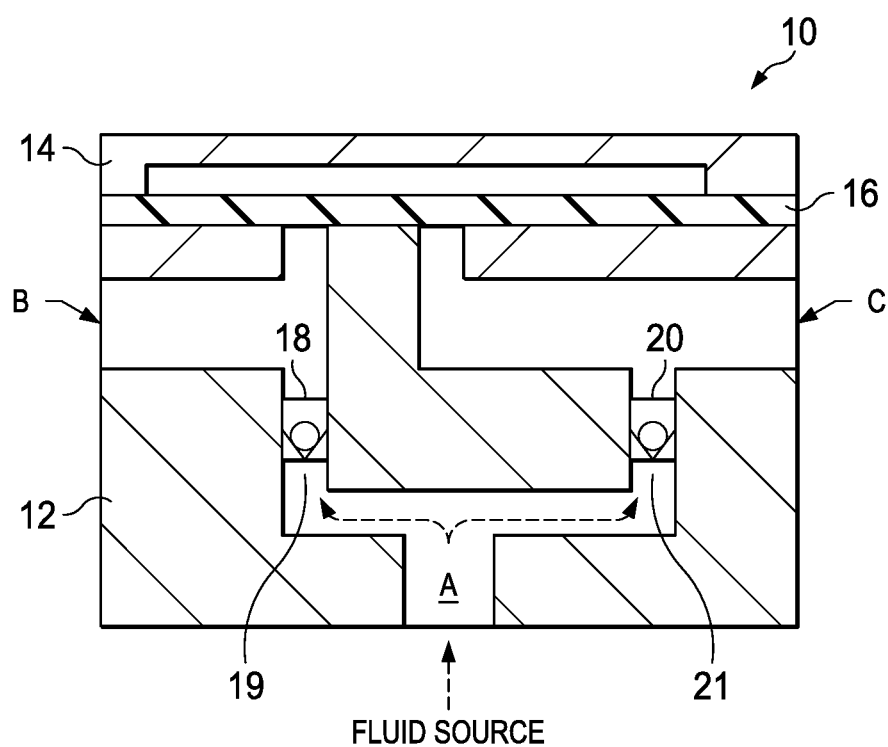
FIG. 2 illustrates fluid flow through the embodiment of FIG. 1.
Figure 3:
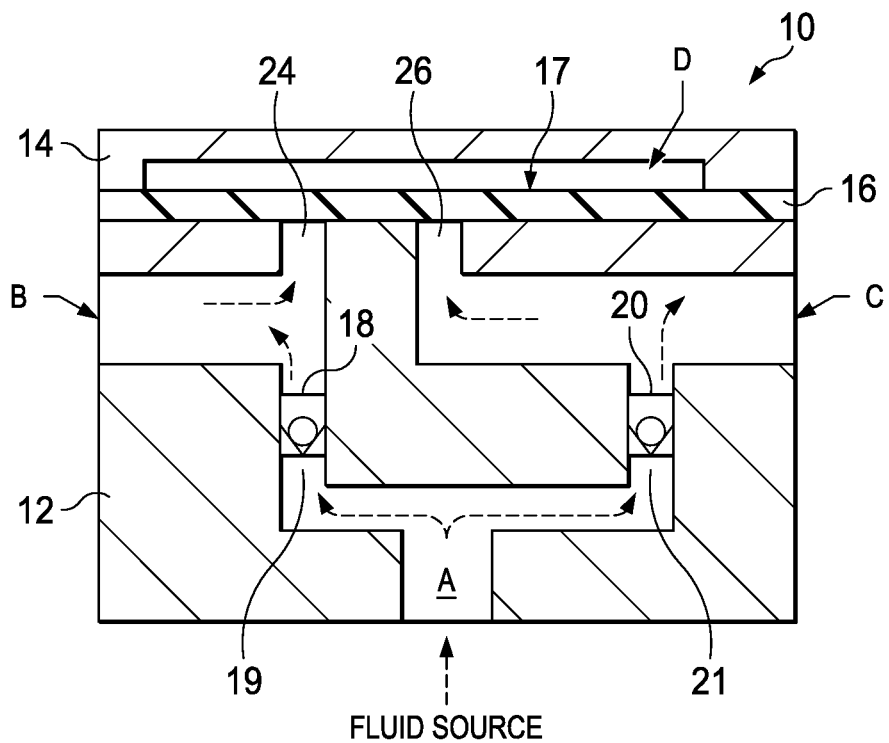
FIG. 3 further illustrates fluid flow through the embodiment of FIG. 1.
Figure 4:
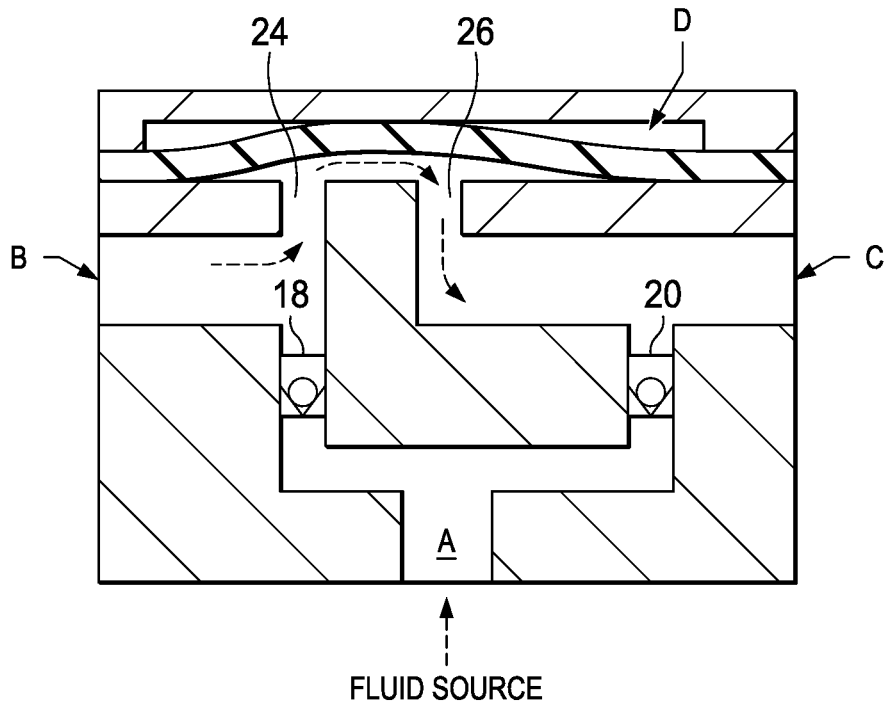
FIG. 4 yet further illustrates fluid flow through the embodiment of FIG. 1.

Operation of the valve assembly of FIG. 1 may be understood with reference to FIGS. 2-4. As may be seen in FIG. 2, pressurized fluid may flow at an inlet into the fluid chamber A from a fluid source, such as the pressure source for an automatic tire inflation system. The pressurized fluid may be provided at a pressure suitable for proper inflation of a tire, such as 95 psi or 110 psi, depending on the tire. The fluid may flow from fluid chamber A to fluid channels 19, 21. If the fluid pressures at ports B and C are at or above the pressure of the fluid from the fluid source, then the one-way valves 18 and 20 will remain closed, thus preventing fluid flow from fluid chamber A to ports B and C. Likewise, if the fluid source is de-activated, and the pressure in fluid chamber A drops below the fluid pressures at ports B and C, then the one-way valves 18 and 20 will remain closed, thus preventing fluid flow from ports B and C to fluid chamber A. In some embodiments, the cracking pressure of the diaphragm 16 may be set at a pressure lower than the desired tire inflation pressure. Thus, if the vehicle tires are not equally under-inflated or at unequal pressures lower than the pressure of fluid provided in fluid chamber A, the diaphragm 16 may also open to allow fluid to flow between ports C and B, even if the fluid source is de-activated, or the pressure in the fluid chamber A is lower than the pressure of the fluid in ports C and B.

As may be seen in FIG. 3, if the fluid pressures at ports C and B are each below the pressure of the fluid from the fluid source, then the one-way valves 18 and 20 will open to allow fluid flow from fluid chamber A to ports C and B. Because one-way valves 18 and 20 allow fluid to flow from fluid chamber A to ports C and B, respectively, the fluid pressure in ports C and B tends to substantially equalize with the fluid pressure in fluid chamber A. Depending on the stiffness and configuration of the one-way valves 18 and 20, the fluid pressures in ports C and B and in fluid chamber A may be substantially equal, e.g., within ±2 psi. Fluid may then flow from ports C and B to the respective tires (not shown).

Thus, if the fluid pressure in ports B and C is substantially equal but lower than the fluid pressure in chamber A, then pressurized fluid from the fluid source may flow into chamber A, through the one-way valves 18 and 20, and into ports C and B, respectively, and from those ports to the tires, thus inflating the tires to the pressure of the fluid provided from the fluid source. If vehicle tires are in fluid communication with ports C and B, pressurized fluid may be provided to fluid chamber A at a pressure suitable for proper tire inflation. If the vehicle tires are under-inflated or at a pressure lower than the pressure of fluid provided in fluid chamber A, then pressurizing fluid may flow from fluid chamber A through one-way valves 18 and 20, into the vehicle tires through ports C and B, respectively. In some embodiments, the cracking pressure of the diaphragm 16 may be set at a pressure lower than the desired tire inflation pressure. Thus, if the vehicle tires are not equally under-inflated or at unequal pressures lower than the pressure of fluid provided in fluid chamber A, the diaphragm 16 may also open to allow fluid to flow between ports C and B.

As may be further seen in FIG. 3, fluid may flow from port B to fluid channel 24, and fluid may flow from port C to fluid channel 26. Diaphragm 16 may seal fluid channels 24 and 26, thus essentially forming a two-way valve 17 between fluid channels 24 and 26. A pressure differential between fluid channels 24 and 26 may allow fluid to flow between ports B and C through two-way valve 17. Thus, the fluid pressure in fluid channels 24 and 26 may tend to substantially equalize with the fluid pressure in ports C and B. Depending on the stiffness and configuration of the diaphragm 16, the fluid pressures in ports C and B may be substantially equal, e.g., within ±2 psi. Thus, if the fluid pressure in port B is lower than the fluid pressure in chamber A and the fluid pressure at port C, then pressurized fluid from the fluid source may flow from chamber A through the one-way valve 18 and into port B, and also from port C to port B through the two-way valve 17. Similarly, if the fluid pressure in port C is lower than the fluid pressure in chamber A and the fluid pressure at port B, then pressurized fluid from the fluid source may flow from chamber A through the one-way valve 20 and into port C, and also from port B to port C through the two-way valve 17.

In some embodiments, fluid channels 24 and 26 may be disposed at locations equidistant from the center of the diaphragm. In yet other embodiments, the fluid channels 24 and 26 may not be disposed equidistant from the center of the diaphragm 16. For example, fluid channel 26 may be disposed at the center of the diaphragm 16, and fluid channel 24 may be disposed away from the center of the diaphragm 16. Or, fluid channel 26 may be disposed closer to the center of the diaphragm 16 than fluid channel 24. In some embodiments, the cross-sectional area of fluid channel 24 may be different from the cross-sectional area of fluid channel 26 so as to vary the surface area of the diaphragm against which fluid may exert pressure. By varying the location and/or cross-sectional area of the fluid channels, the diaphragm valve 17 may be configured to more easily allow fluid from one fluid channel to flow to the other fluid channel, than from the other fluid channel to the first fluid channel, or may allow the diaphragm to open under substantially the same pressure whether felt from port B or port C when asymmetrically disposed.

For example, as may be seen in FIG. 4, if the fluid pressure at port B is greater than the fluid pressure in port C, then the fluid may force the diaphragm 16 to flex or lift into chamber D, thus unsealing fluid channels 24 and 26. Chamber D may, in some embodiments, vent to atmosphere so that the pressure in chamber D, and thus on that side of the diaphragm, remains more or less constant. With the diaphragm 16 lifted, then fluid may flow from fluid channel 24 to fluid channel 26. Similarly, if the fluid pressure at port C is greater than the fluid pressure in port B, then the fluid may force the diaphragm 16 to lift, thus unsealing fluid channels 24 and 26. With the diaphragm 16 lifted, then fluid may flow to fluid channel 24 from fluid channel 26.

The fluid pressure in the fluid chamber A may be provided by a constant-pressure automatic tire inflation system. In such a system, the fluid chamber A will provide a constant pressure of fluid to ports C and B. In some embodiments, the cracking pressure of the diaphragm 16 may be set at a pressure lower (e.g., about 95 psi) than the desired tire inflation pressure (e.g., about 110 psi). When the ports B and C are pressurized to the desired tire inflation pressure, the diaphragm will crack open and remain open until the pressure drops to about 95 psi, thus allow the pressures in ports B and C (and hence the tires) to constantly equalize during use of the system. Even if the system is de-activated, and the pressure in the fluid chamber A drops toward zero or well below the desired tire inflation pressure, the check valves 19 and 21 may close, but the diaphragm 16 may remain open until the pressure in both ports B and C drops to or below about 95 psi. If the vehicle tires are not at equal pressures lower than the pressure of fluid provided in fluid chamber A, the diaphragm 16 may also open to allow fluid to flow between ports C and B.

If the vehicle is idle, such as in a yard, the diaphragm may close. If the pressure in the tires at ports B and C, respectively, becomes unequal, but are still lower than the cracking pressure of the diaphragm, then the diaphragm will serve to isolate the tires, thus preventing both tires from going flat if one tire goes flat. When automatic tire inflation system is activated upon vehicle operation, then the tires may both be inflated to the desired tire pressure.

In some embodiments, the diaphragm 16 may provide sufficient sealing force against fluid channels 24 and 26 that a pressure substantially at or exceeding the pressure of fluid from the fluid source A is required to lift the diaphragm 16 away from the fluid channels 24 and 26. Thus, if the fluid pressure in port C is lower than the fluid pressure at port B because of a tire leak or rupture, then the fluid pressure in port B may not drop substantially below the pressure required to lift the diaphragm 16 away from fluid channel 24. Or, if the fluid pressure at port C is at a desired pressure but the fluid pressure at port B is greater than the fluid pressure in port C, such as due to the port B tire facing the sun and increasing in pressure because of temperature rise over the port C tire, then the fluid may force the diaphragm 16 to lift, thus unsealing fluid channels 24 and 26 and allowing fluid to flow from fluid channel 24 to fluid channel 26.

Thus, fluid pressures may be substantially equalized between two tires. If, for example, two tires are mechanically coupled in a dual-tire arrangement at a wheel end, then they must rotate together. Substantial differences in fluid pressure between those two tires may cause them to have different effective diameters, thus causing one tire to drag briefly during rotation. Such drag may cause premature tire wear and shorten tire life. Substantially equalizing the tire pressure may allow the tire diameters to be substantially equal, thus allowing longer tire life.

Figure 5:
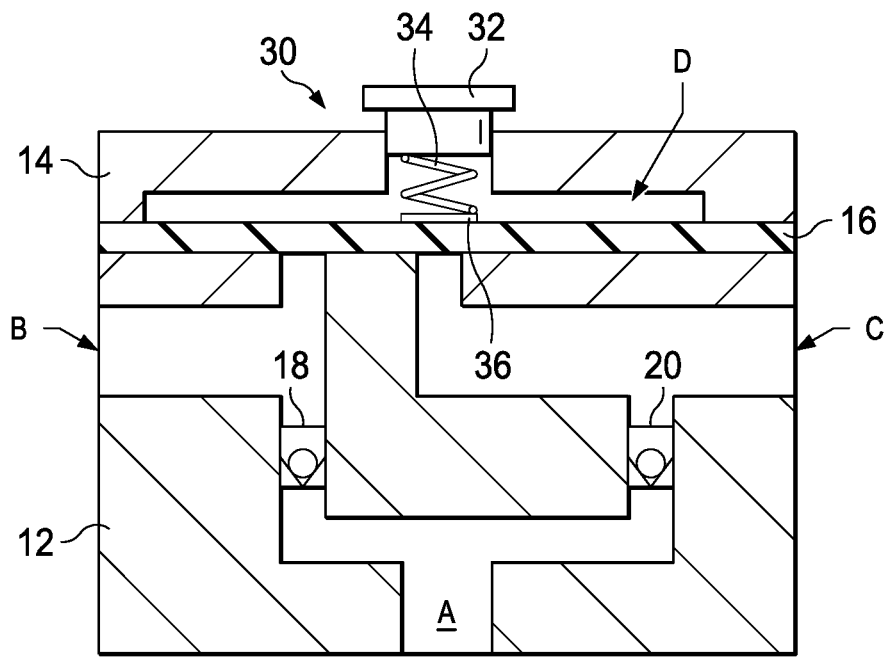
FIG. 5 illustrates one embodiment of a pressure equalization valve assembly having a cracking pressure adjustor.

In other embodiments, the cracking pressure at which the diaphragm 16 will lift may be changed by an adjustor 30, such as may be seen in FIG. 5. In the embodiment of FIG. 5, the adjustor may comprise a knob 32 threadably or slidably disposed in an aperture into chamber D. In some embodiments, the adjustor may include a vent to atmosphere so that the pressure in chamber D remains substantially constant. A spring 34 may be disposed between the knob and the diaphragm 16. The knob 32 may be advanced toward the diaphragm 16, thus compressing the spring 34 and adding to the resistance of the diaphragm 16 against lifting. Alternatively, the knob 32 may be adjusted away from the diaphragm 16, thus decompressing the spring 34 and removing spring resistance from the diaphragm 16. In other embodiments, the spring 34 may be replaced by any suitable biasing mechanism, such as additional diaphragm layers, a gas cylinder or elastomeric body. In some embodiments, a protective sheet 36 or plate may be disposed between the spring 34 and diaphragm 16 so as to protect the diaphragm 16 from puncture or abrasion. In yet further embodiments, the pressure in chamber D may be increased or decreased (whether or not an adjustor 30 is used) to change the effective cracking pressure at which the diaphragm 16 may lift to crack open the fluid channels 24 and 26.

One benefit of using a biasing mechanism such as an adjustor is the damping force applied to the diaphragm 16. As a vehicle travels on a road, resulting vibration may cause an undamped diaphragm 16 to flutter sufficiently to leak fluid between fluid channels 24 and 26. Vibration of the diaphragm may occur from road conditions, or jarring forces while at rest, or fluid pressure impulses. Vibrational movement of the diaphragm may allow fluid to flow between fluid channels even when there is little to no pressure imbalance between the fluid channels, and may particularly allow fluid flow when there is pressure imbalance sufficient or close to sufficient to overcome the diaphragm cracking pressure. A spring, such as an elastomeric body, or a compression coil, or a gas cylinder may be provided against the diaphragm to dampen vibration.

In some embodiments, the spring may provide a relatively light force, e.g., equivalent of 1-5 psi, against the diaphragm 16. In some embodiments, the elasticity of the diaphragm may allow for a pressure imbalance of 0-3 psi between fluid channels 24 and 26. A spring may increase that pressure imbalance by a further 1-5 psi.

Figure 6:
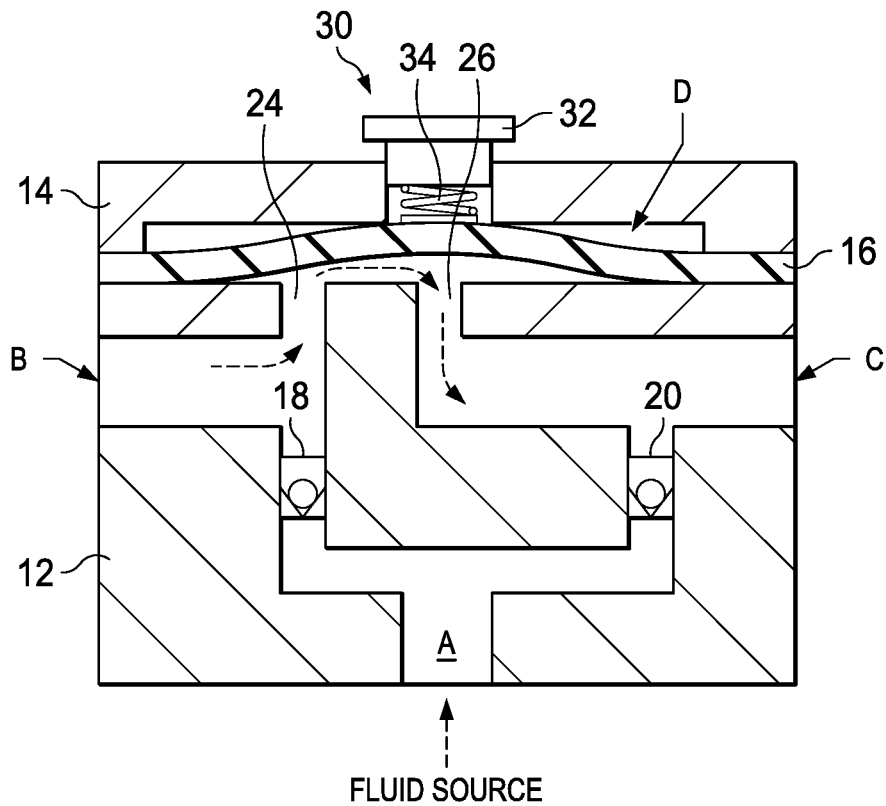
FIG. 6 illustrates fluid flow through the embodiment of FIG. 5.

Thus, in operation, as may be seen in connection with FIG. 6, an embodiment including an adjustor 30 may operate in a similar fashion as that described in connection with the embodiment of FIG. 4. If the fluid pressure at port B is greater than the fluid pressure in port C, then the fluid may force the diaphragm 16 to lift into chamber D, thus unsealing fluid channels 24 and 26. With the diaphragm 16 lifted, then fluid may flow from fluid channel 24 to fluid channel 26. Similarly, if the fluid pressure at port C is greater than the fluid pressure in port B, then the fluid may force the diaphragm 16 to lift, thus unsealing fluid channels 24 and 26. With the diaphragm 16 lifted, then fluid may flow to fluid channel 24 from fluid channel 26.

Any other suitable two-way valve may be used in place of diaphragm valve 17. For example, a ball-and-seat valve may be used, either with or without a biasing mechanism, such as a spring or elastomeric member.

In other embodiments, a valve assembly may further comprise a pressure relief valve. As may be seen in the embodiment of FIG. 7, part M of valve assembly 50 may operate just as described in connection with FIGS. 1-4. A pressure relief valve 52 may be disposed in fluid communication with one of the ports B or C (shown here in fluid communication with port C). The pressure relief valve 52 may comprise a diaphragm 54 disposed within the valve assembly 50 so as to seal fluid channel 56, which is in fluid communication with port C. The diaphragm 54 may also seal an exhaust port 58, which may be in fluid communication with atmosphere. In some embodiments, the non-sealing side of the diaphragm 54 may be vented to atmosphere. The diaphragm 54 may provide sufficient sealing force against fluid channel 56 that a fluid pressure exceeding a threshold pressure may be required to lift the diaphragm 16 away from the fluid channels 25 and 26. The threshold cracking pressure of diaphragm 54 may be equal to or greater than the cracking pressure of diaphragm 16. In some embodiments, the diaphragm 54 and the diaphragm 16 may comprise a single diaphragm physically restricted by the valve body so as to function as separate diaphragms.

Figure 8:
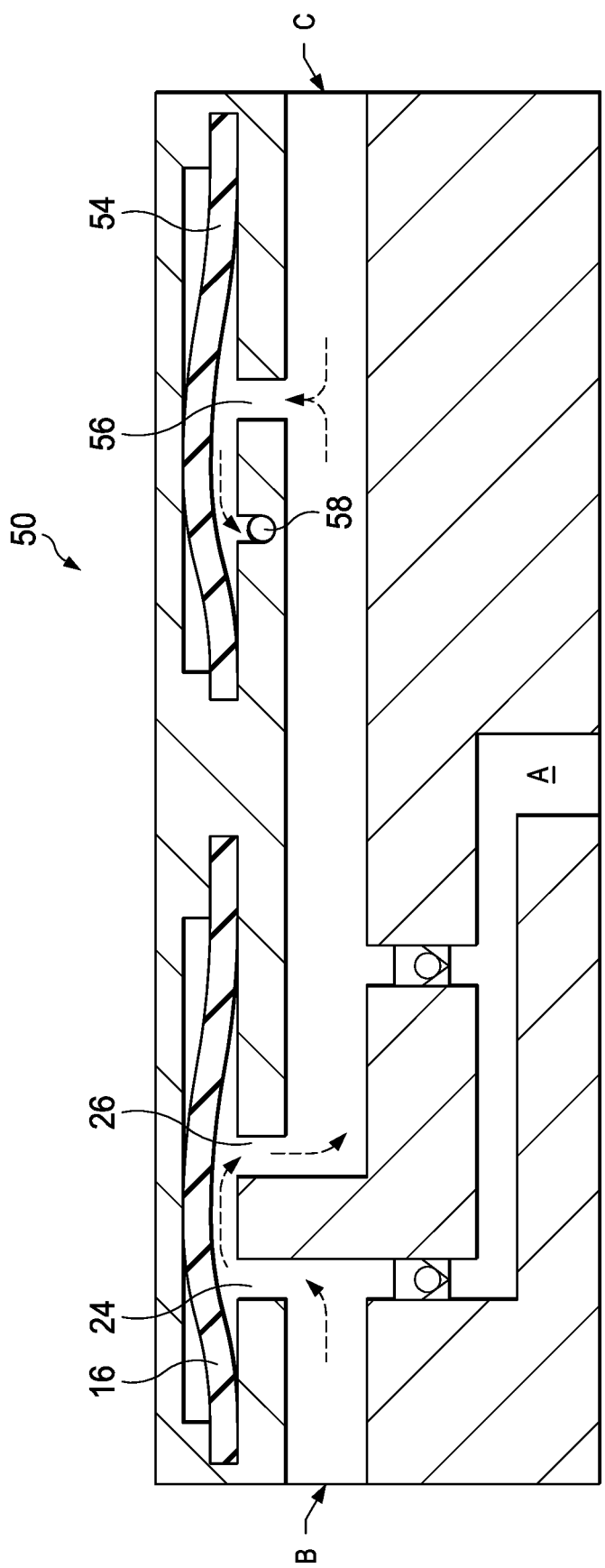
FIG. 8 illustrates fluid flow through the embodiment of FIG. 7.
Figure 9:
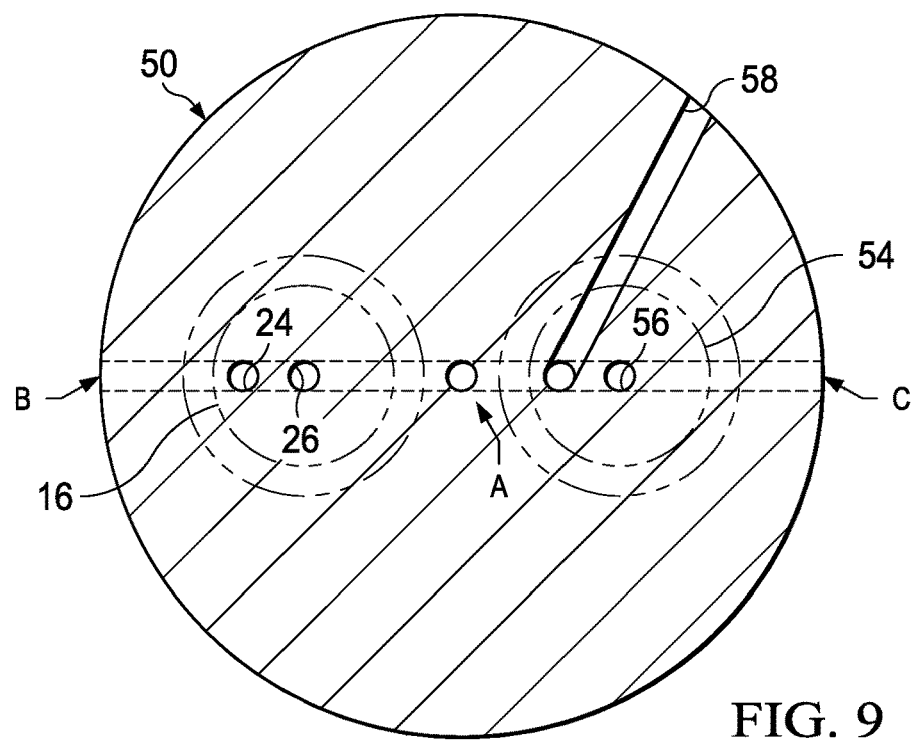
FIG. 9 illustrates a plan view of fluid channels in the embodiment of FIG. 7.

In operation, if the pressure at ports B and/or C exceeds the cracking pressure of diaphragm 16, such as at about 3 psi over the fluid pressure provided at port A, then diaphragm 16 may lift to allow fluid to flow between fluid channels 24 and 26 to substantially equalize pressures in ports B and C as described above. Such circumstance may arise, for example, if a vehicle tire is over-inflated. Over-inflation may occur from, for example, elevation changes and temperature changes, such as by absorbing radiant energy (e.g., the tire is exposed to sunlight) and normal road use. If the pressure at ports B and C further exceeds the cracking pressure of diaphragm 54, such as at about 8 psi over the fluid pressure provided at port A, then diaphragm 54 may lift to allow fluid to flow from fluid channel 56 to exhaust port 58, as shown in the embodiment of FIG. 8. When the pressure at ports B and C reduces to substantially at or below the cracking pressure of diaphragm 54, then diaphragm 54 may relax back to seal fluid channel 56. FIG. 9 illustrates a cutaway plan view of the embodiment of FIG. 7 to better reveal an example of how diaphragms 16 and 54 may be disposed in the valve block 50.

Figure 10:
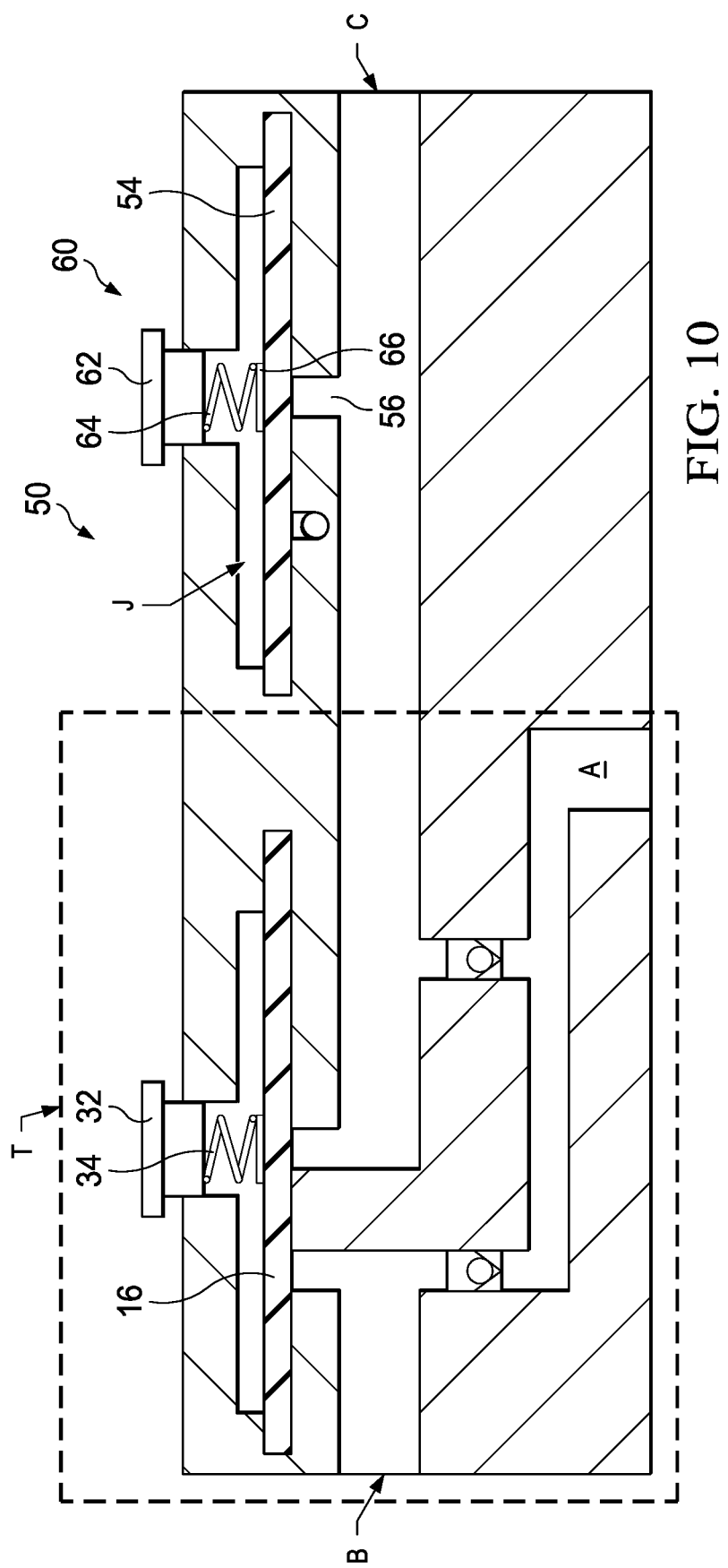
FIG. 10 illustrates one embodiment of a pressure equalization valve assembly having a plurality of cracking pressure adjustors.

In further embodiments, the cracking pressure at which the diaphragm 54 will lift may be changed by an adjustor 60, such as may be seen in FIG. 10. The adjustor may comprise a knob 62 threadably or slidably disposed in an aperture into chamber J. A spring 64 may be disposed between the knob and the diaphragm 16. The knob 62 may be advanced toward the diaphragm 54, thus compressing the spring 64 and adding to the resistance of the diaphragm 54 against lifting. Alternatively, the knob 62 may be adjusted away from the diaphragm 54, thus decompressing the spring 64 and removing spring resistance from the diaphragm 54. In other embodiments, the spring 64 may be replaced by any suitable biasing mechanism, such as additional diaphragm layers, or elastomeric material. In some embodiments, a protective sheet 66 or plate may be disposed between the spring 64 and diaphragm 54 so as to protect the diaphragm 54 from puncture or abrasion. In yet further embodiments, the pressure in chamber J (whether or not an adjustor 60 is used) may be increased or decreased to change the effective cracking pressure at which the diaphragm 54 may lift to crack open the fluid channel 56.

In the embodiment of FIG. 10, the diaphragm 16 may also be provided with an adjustor knob 32, as described in connection with FIG. 5. If diaphragm 16 includes an adjustor, then part T of valve assembly 50 may operate just as described in connection with FIGS. 5 and 6. Of course, the valve assembly 50 may alternatively not include an adjustor knob, such as is shown in part M of FIG. 7.

Figure 11:
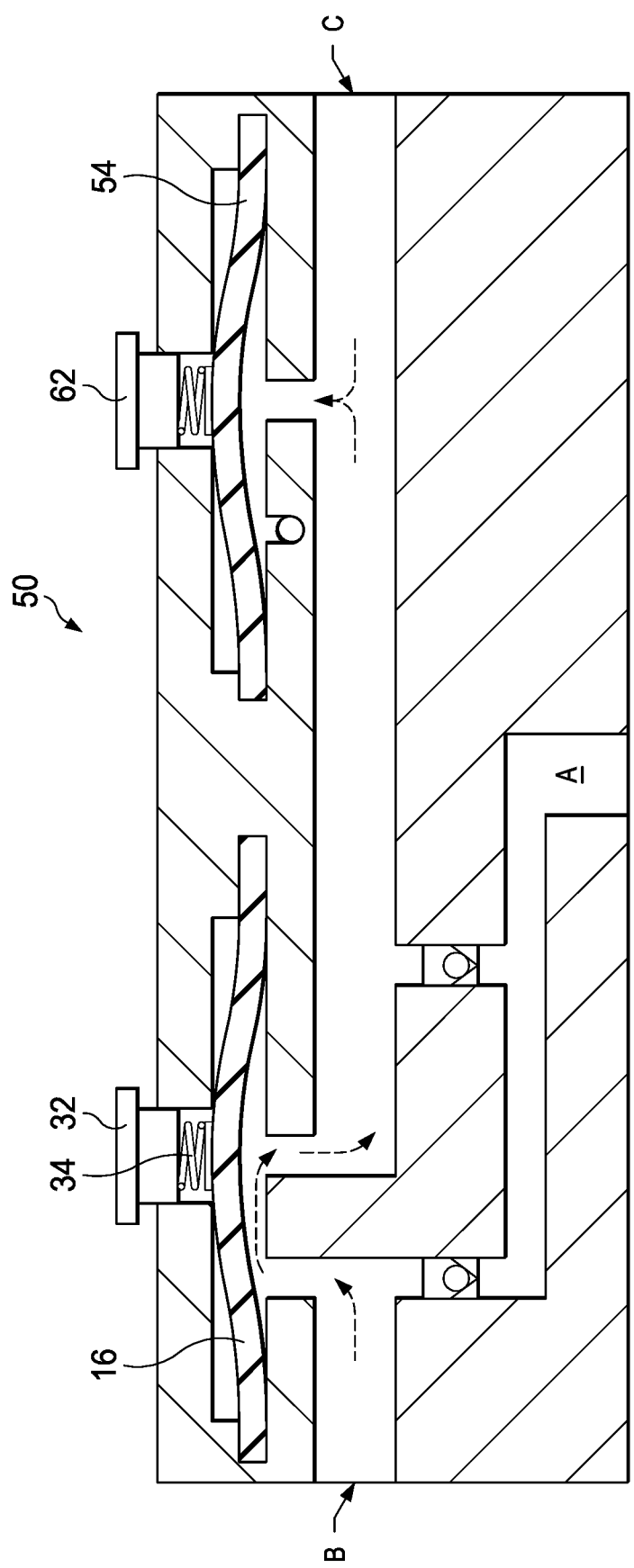
FIG. 11 illustrates fluid flow through the embodiment of FIG. 10.

As is illustrated in FIG. 11, in operation, if the pressure at ports B and/or C of the embodiment of FIG. 10 exceeds the cracking pressure of diaphragm 16, such as at about 5 psi over the fluid pressure provided at port A, then diaphragm 16 may lift to allow fluid to flow between fluid channels 24 and 26 to substantially equalize pressures in ports B and C as described above. If the pressure at ports B and C further exceeds the cracking pressure of diaphragm 54, such as at about 10 psi over the fluid pressure provided at port A, then diaphragm 54 may lift to allow fluid to flow from fluid channel 56 to exhaust port 58, as shown in the embodiment of FIG. 8. When the pressure at ports B and C reduces to substantially at or below the cracking pressure of diaphragm 54, then diaphragm 54 may relax back to seal fluid channel 56.

Figure 12:
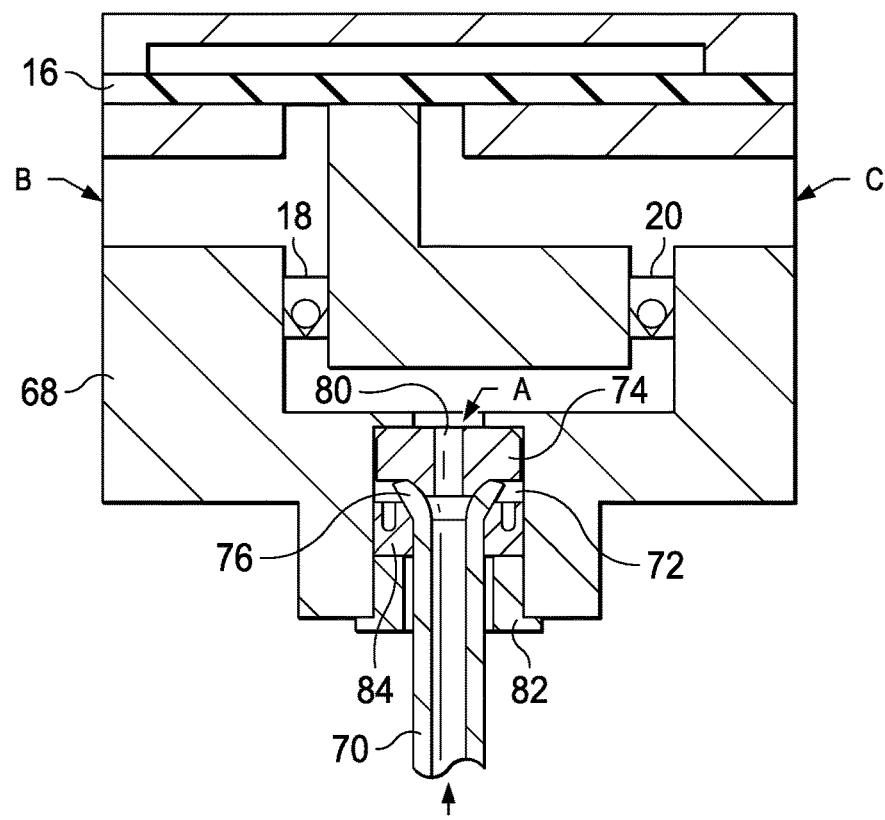
FIG. 12 illustrates one embodiment of a pressure equalization valve assembly having a rotary air connection.

In yet further embodiments, the valve assembly may comprise a portion of a rotary union or rotary air connection for a tire inflation system. For example, as may be seen in FIG. 12, a rotary air connection may be provided as generally described in U.S. Pat. No. 6,698,482, which is incorporated herein fully by reference. A valve assembly 68 may have a tubular member 70 disposed in an inlet 72. The tubular member 70 may in some embodiments rotate with respect to the valve assembly 68. A bearing 74 may be disposed between an end 76 of the tubular member 70 and a face 78 of the inlet. A fluid channel 80 in the bearing may allow pressurized fluid to flow from the tubular member into the fluid chamber A. A seal 84, such as an o-ring or lip seal, may be disposed about the tubular member so as to seal the tubular member and valve assembly. A cap 82 may be disposed in the inlet about the tubular member so as to retain the end 76 of the tubular member and bearing in the valve assembly. The tubular member may be rigid, flexible, or a combination of rigid or flexible members.

Figure 13:
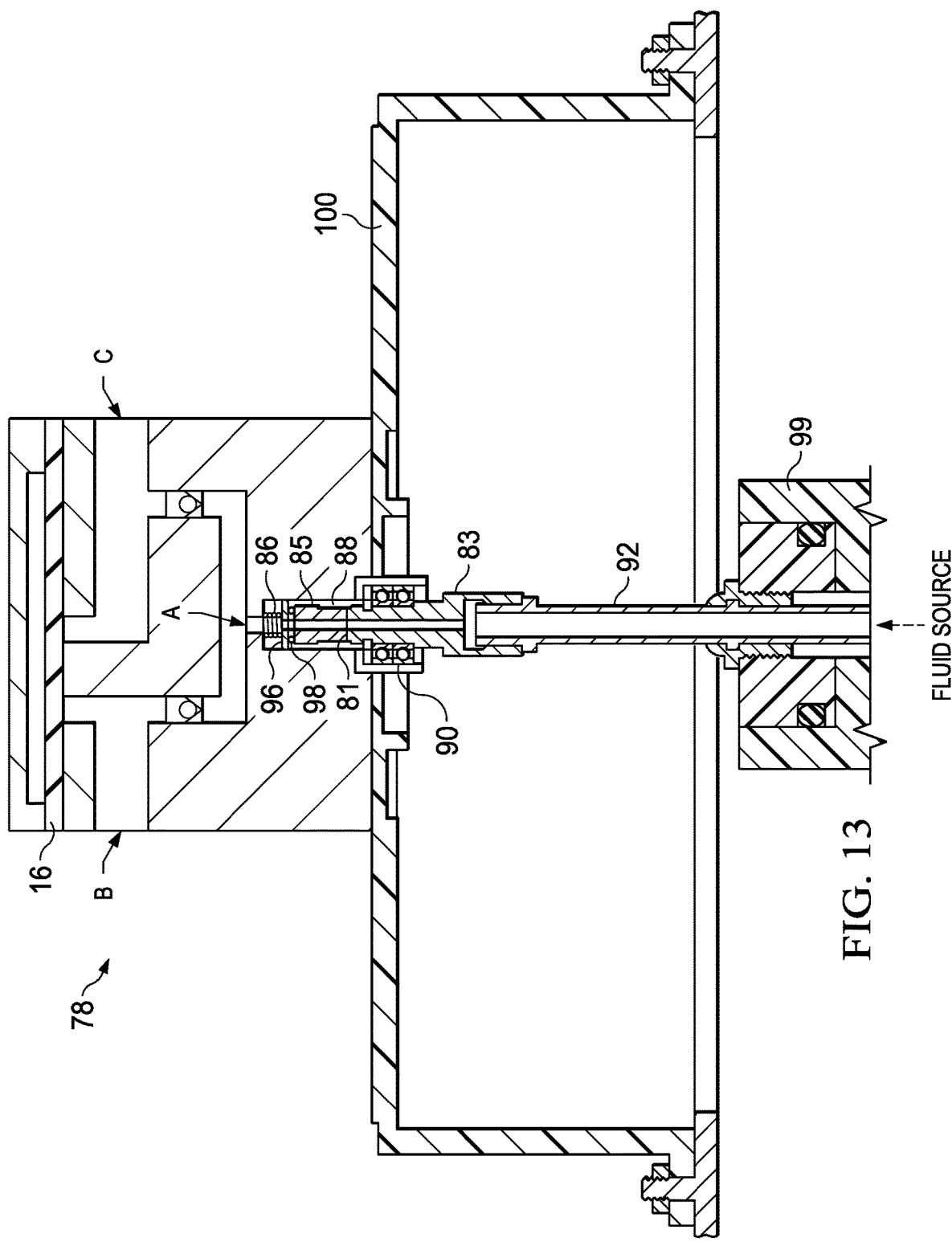
FIG. 13 illustrates another embodiment of a pressure equalization valve assembly having a rotary air connection.

A valve assembly (whether for one or more vehicle tires) as described herein may be used in connection with any other rotary air connection suitable for a vehicle tire inflation system. For example, as may be seen in FIG. 13, a face seal 80 may be provided in connection with the valve assembly 78, such as the face seal disclosed in U.S. Pat. No. 6,105,645, which is incorporated herein fully by reference. The rotary union may comprise a rigid shaft 83, a graphite member 85 and a spring 86. The spring and graphite member may be disposed in an inlet 88 of the valve assembly 78. The spring may urge the graphite member 85 against the rigid shaft 83, thereby forming a face seal 81. Bearings 90 may allow the valve assembly to rotate with respect to the rigid shaft. The rigid shaft may be sealingly connected to a flexible tubular member 92, which may in turn be sealingly connected to a fluid source in an axle 99. Pressurized fluid may flow through the flexible tubular member, rigid shaft, graphite member and spring into fluid chamber A. Fluid may flow through the valve assembly 78 from fluid chamber A as described above. The rigid shaft may comprise steel. A washer 96 and o-ring 98 may be disposed between the spring and graphite member. The valve assembly 78 may be mounted to the exterior of a hubcap 100. Ports B and C may each be sealingly connected to a vehicle tire.

Figure 14:
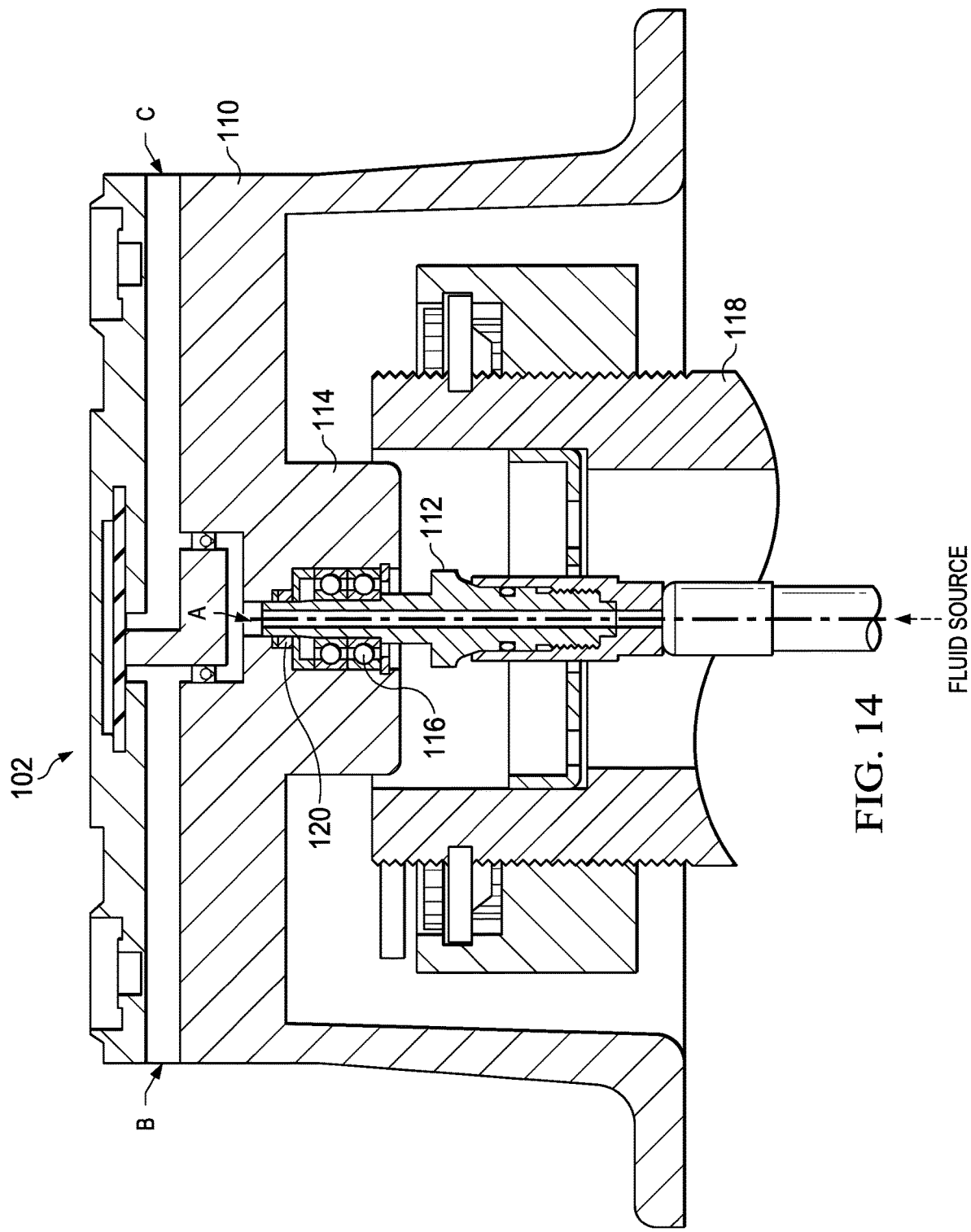
FIG. 14 illustrates yet another embodiment of a pressure equalization valve assembly having a rotary air connection.

Similarly, as may be seen in FIG. 14, the valve assembly 102 may be incorporated into a hub cap rotary union, such as the rotary connection of U.S. Pat. No. 8,505,600, which is incorporated herein fully by reference. In the embodiment of FIG. 14, a hub cap 110 may comprise a rotary union stem 112 rotatably mounted to a hub cap boss 114 by bearings 116. An elastomeric seal 120, such as a lip seal, may seal the rotary union stem with respect to the hubcap. The rotary union stem may be in sealed fluid communication with a fluid source. Pressurized fluid may flow from the pressurized fluid source in the axle 118 through the rotary union stem into the fluid chamber A. Fluid may flow through the valve assembly 102 from fluid chamber A as described above. In the embodiment of FIG. 14, port B may be sealingly connected to a first vehicle tire (not shown) and port C may be sealingly connected to a second vehicle tire (not shown).

In other embodiments, a valve assembly (whether for single or multiple vehicle tires) may be similarly incorporated into a hubcap rotary union, such as the rotary union disclosed in applicant's PCT/US2014/065006, entitled "Rotary Union for Automatic Tire Inflation System," the disclosure of which is incorporated wholly herein by reference.

Use of flexible one-way valves and a diaphragm may allow better equalization of fluid pressures in the fluid chambers A and ports B and C than that permitted by use of metallic or non-elastomeric valves, such as SCHRAEDER® valves. Such valves may comprise elastomeric duck-bill configuration of, e.g., silicon or rubber.

Figure 15:
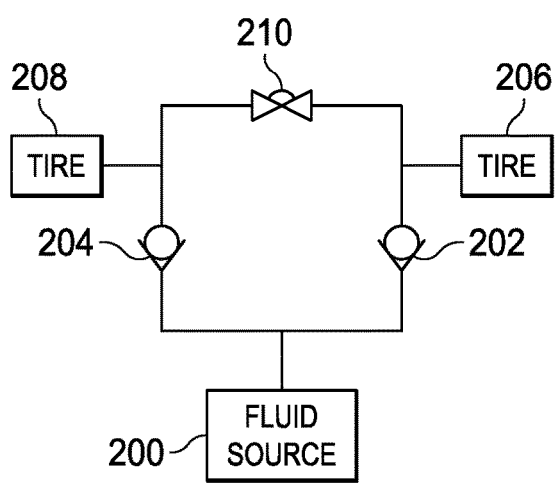
FIG. 15 illustrates one embodiment of a pressure equalization fluid circuit.

FIG. 15 illustrates one embodiment of a fluid flow circuit of a valve assembly. A fluid source 200 may provide pressurized fluid to one-way check valves 202 and 204, which may be adjustable to permit adjustment of the cracking pressure. If the fluid pressure at tires 206 and 208 is lower than the pressure of fluid from the fluid source, then the one-way check valves 202 and 204 may crack open to allow pressurized fluid to flow from the fluid source to the tires 206 and 208. If the fluid pressure at tires 206 and 208 is substantially at or higher than the pressure of fluid from the fluid source, then the one-way check valves 202 and 204 may remain closed to prevent pressurized fluid from flowing from the fluid source to the tires 206 and 208.

If one of the tires, such as tire 206 is at a lower pressure than the pressure in tire 208 but higher than the pressure of fluid from the fluid source, then the one-way check valve 202 may remain closed to prevent pressurized fluid from flowing from the tire 206 to the fluid source. However, the diaphragm valve 210 may open to allow pressurized fluid to flow from tire 208 to tire 206. The cracking pressure of diaphragm valve 210 may be, for example, at about 1 to 3 psi above the cracking pressure of the check valves 202 and 204, and may be adjustable.

If one of the tires, such as tire 206 is at a lower pressure than the pressure in tire 208 and also lower than the pressure of fluid from the fluid source, then the diaphragm valve 210 may open to allow pressurized fluid to flow from tire 208 to tire 206, and the one-way check valve 202 may also crack open to allow pressurized fluid to flow from the fluid source to the tire 206.

Figure 16:
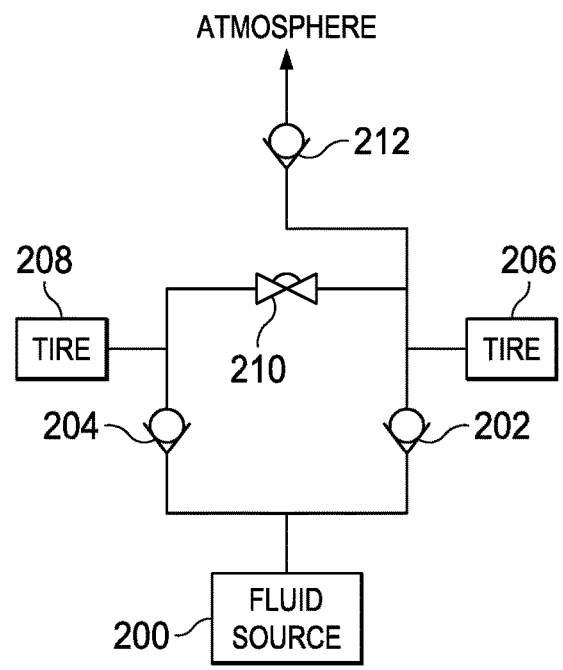
FIG. 16 illustrates one embodiment of a pressure equalization and pressure relief fluid circuit.

In other embodiments, such as is shown in FIG. 16, a pressure relief valve 212 may be added in fluid communication with tire 206. In other embodiments, a pressure relief valve 212 may alternatively be in fluid communication with tire 208, or also in fluid communication with tire 208. In yet other embodiments a second pressure relief valve (not shown) may be added in fluid communication with tire 208. The pressure relief valves may comprise one-way check valves, which may be adjustable. In some embodiments, the pressure relief valves may be adjustably configured with a cracking pressure set at about 3 to 8 psi above the cracking pressure of diaphragm valve 210.

Thus, in one embodiment, if a desired tire pressure is 100 psi, the one-way check valves 202 and 204 may crack open under about 1-2 psi. The diaphragm valve 210 may crack open at about 95 psi. In some embodiments, the diaphragm valve 210 may crack open if one tire 208 is filling faster than another tire 206, such as if one-way check valve 202 is stuck partially or wholly closed. The pressure relief valve 212 may be set at about 105 psi or at about 110 psi, for example.

Figure 17:
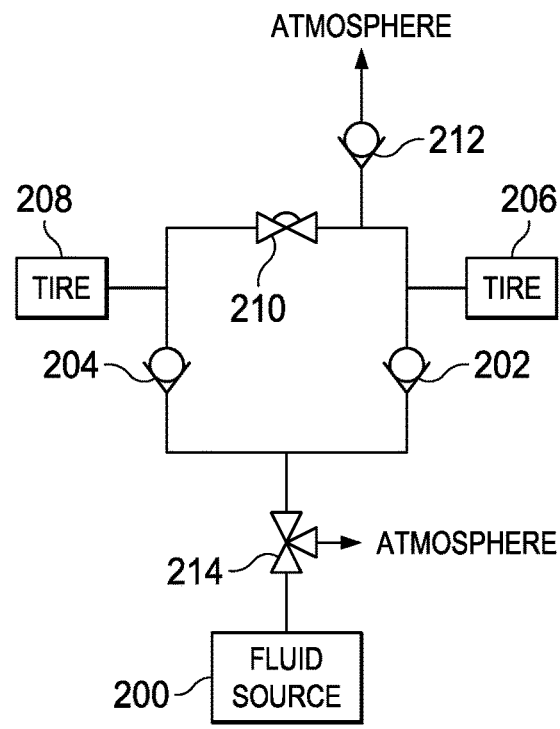
FIG. 17 illustrates one embodiment of a pressure equalization and pressure relief fluid circuit having a dump valve.

In some embodiments, the fluid source 200 may provide a constant pressure to the one-way check valves 202 and 204, such as may be found in constant-pressure automatic tire inflation systems known in the art. That constant pressure may allow the one-way check valves 202 and 204 to briefly open and close during operation without much fluid flow, allowing debris to lodge in the one-way check valves 202 and 204. Thus, in some embodiments, a dump valve may be disposed between the fluid source and the one-way check valves. A dump valve 214 may be used regardless of whether a pressure relief valve 212 is used. As may be seen in the embodiment of FIG. 17, for example, the dump valve 214 may allow the pressure behind one-way check valves 202 and 204 to be dumped to atmosphere. Dumping the pressure behind the one-way check valves 202 and 204 may permit the one-way check valves 202 and 204 to establish and maintain a better seal. In some embodiments, a vehicle operator may periodically open the dump valve 214 to allow the one-way check valves 202 and 204 to better seat. For example, the dump valve 214 may be activated when the fluid source is de-activated, such as when a vehicle air brake system is de-pressurized. In other embodiments, a dump valve 214 may be periodically opened by an electronic processing unit.

In some embodiments, the dump valve 214 may allow pressurized fluid to flow from the fluid source 200 to the one-way check valves 202 and 204 when the fluid source is activated. When the fluid source is de-activated, the dump valve 214 may open to allow some or all of the fluid in the fluid conduits between the fluid source 200 and the one-way check valves 202 and 204 to be dumped to atmosphere, thus allowing the fluid conduits to be de-pressurized. In some embodiments, the dump valve 214 may be disposed downstream of a pressure regulator, if a pressure regulator is used. In such embodiments, the dump valve 241 may allow air to flow from the regulator to the one-way check valves 202 and 204 when activated (or de-activated, depending on the type of dump valve), and when de-activated (or activated, as the case may be), may prevent pressurized fluid from flowing from the regulator and also dump pressurized fluid from the fluid conduits between the dump valve 214 and the one-way check valves 202 and 204. A pressure regulator may comprise such a dump valve.

The dump valve 214 may be electrically, manually or pneumatically-activated. For example, if the fluid source 200 comprises a vehicle air brake air tank, the dump valve 214 may be electrically connected to the vehicle ignition so that when the vehicle ignition is activated, the dump valve may close and allow air to flow from the fluid source 200 to the one-way check valves 202 and 204. In other embodiments, the dump valve 214 may be configured to release pressurized fluid to atmosphere when the air brake pressure is dumped.

Figure 18:
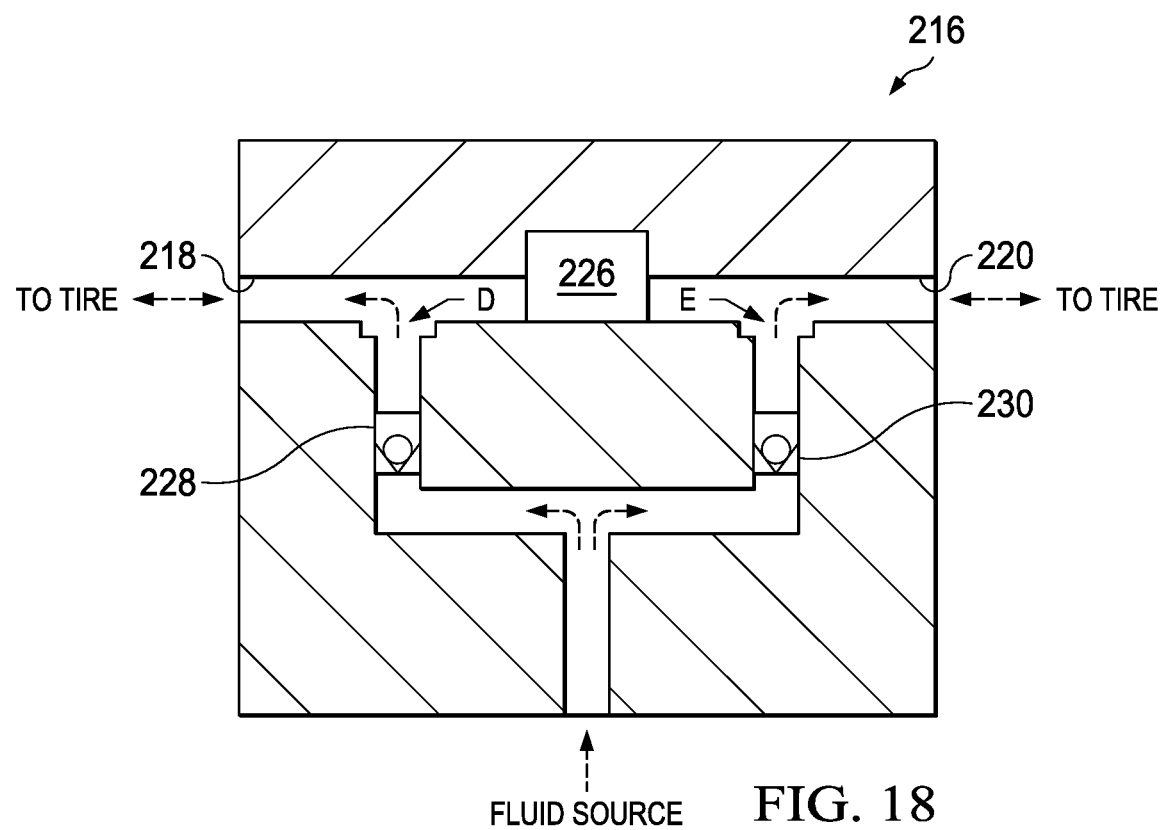
FIG. 18 illustrates another embodiment of a pressure equalization valve assembly comprising a two-way valve and a plurality of one-way valves.
Figure 19:
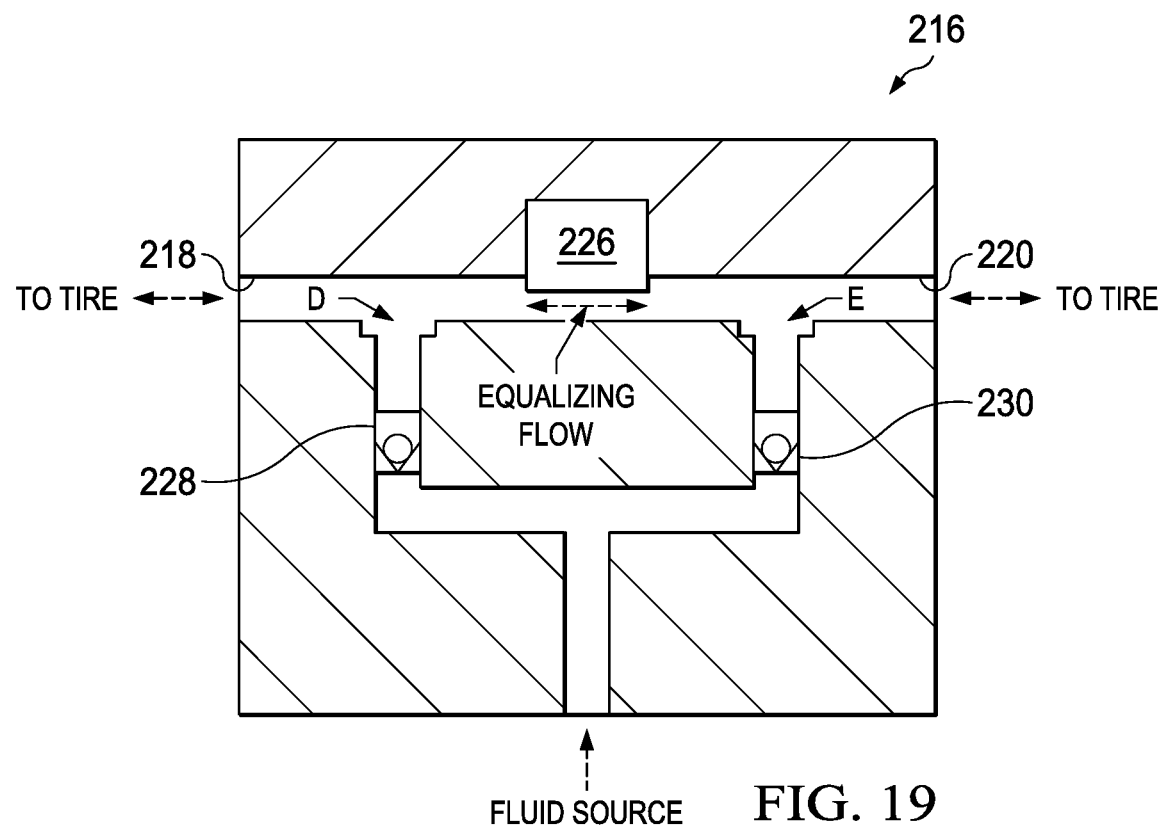
FIG. 19 illustrates the embodiment of FIG. 18 having the two-way valve open.

In the embodiment of FIG. 18, the two-way diaphragm valve of the foregoing embodiments may be replaced with any suitable two-way valve. In one embodiment, a piston equalization actuator assembly 226 may be used. Such an embodiment may function under the same principles as the embodiments previously disclosed. The piston equalization assembly may comprise a piston valve that may serve to initially prevent fluid flow between chamber D and chamber E. Each chamber D and E may be in fluid communication with a tire of the vehicle and as such pressure in a chamber may serve as an analogue to the actual tire. As illustrated in FIG. 19, the piston valve assembly will open when the fluid pressure in one of the chambers D or E reaches a set cracking pressure. After opening, the pressure between the connected chambers D and E may equalize or reduce to below the cracking pressure. If the pressure in the chambers D and E drop below the cracking pressure, then the piston valve assembly may close and isolate the chambers D and E from one another.

Some embodiments may include a set of check valves 228 and 230 disposed so as to prevent fluid backflow from the tires to the fluid supply. Said check valves 228 and 230 may be internal to the valve assembly 216 or may be disposed external to the valve assembly 216. Embodiments of the internal check valves 228 and 230 are described in more detail herein.

Figure 20:
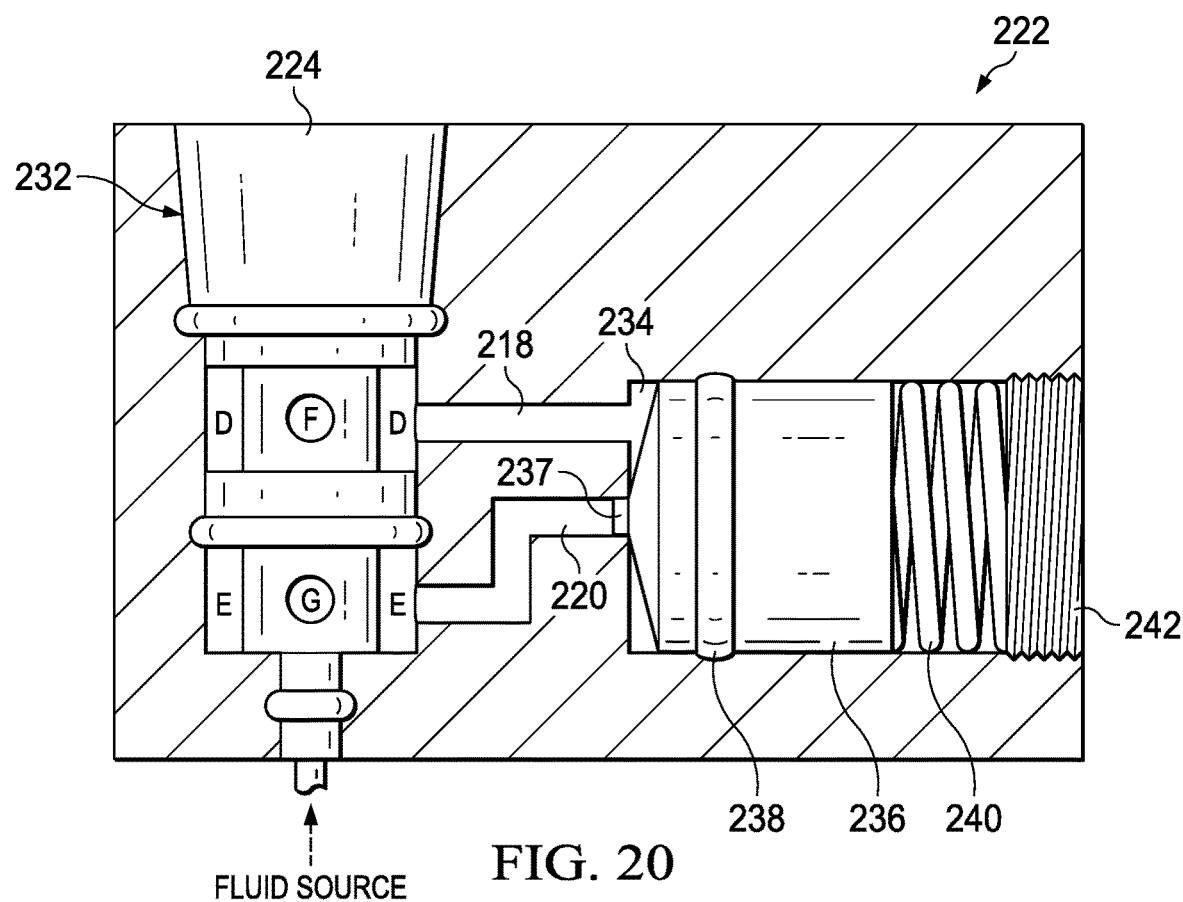
FIG. 20 illustrates another embodiment of a pressure equalization valve assembly comprising a two-way valve and a plurality of one-way valves.

As may be seen in FIG. 20, a piston equalization assembly may comprise a valve body 222, valve core 224, and a piston 236. Pressurized air may be supplied from a fluid pressure supply to the valve core 224, and through ports F and G, respectively, of the valve core 224, to pressure chambers D and E. Pressure chambers D and E may be in fluid communication with tires (not shown). Pressure chambers D and E may maintain fluid communication with the piston 236 through channels 218 and 220, respectively, that are formed in the valve body 222.

The valve body 222 may serve as the outer housing of the piston equalization assembly. Such a valve body 222 may have fluid channels 218 and 220 routed through the body, an area 232 configured so as to accept the valve core 224, and an area 234 in which the piston valve assembly may be disposed. The valve body 222 may be attached to a hub cap (such as mounted inside or outside of a hubcap), or made part of a vehicle hubcap. Such attachment may be achieved by any means of mechanical coupling, such as bolted connections, threaded connections, clips, brackets, welding, and any other means found in the field of automotive design. Such attachment may be at the interior of the hubcap or the valve assembly may reside exterior to the hubcap. Exterior mounting may be realized in the hub cap itself or the valve assembly may be disposed on the inside or the outside of a hubcap. For example, the pressure chambers D and E may be in fluid communication with the associated tires by means of channels routed through a hubcap. Alternatively, the air supply may be routed through a hubcap and then into the piston equalization assembly. The pressure chambers D and E may maintain fluid communication with the associated tires. There may exist other components of a tire inflation system between the valve assembly and the associated tires. Said components may include pressure monitors, pressure regulators, tubing and hoses, valves and/or fittings.

As with various other components disclosed herein valve body 222 may be constructed of zinc, aluminum, brass, or any other suitable material. The valve body 222 may also be of a copolymer or polymer material, either synthetic or natural. The material may need to withstand the heat loads, stresses, strains, and forces typically associated with the operation and maintenance of a semi-trailer. The material may also need to be chemically inert when place in contact of such things as lubricating oil, grease, hydraulic fluid, and any other chemicals associated with the operation and maintenance of a semi-trailer.

The piston valve assembly may comprise a piston 236, seal 238 such as an annular seal (e.g., a lip seal or o-ring), spring 240, and cap 242. The nose 237 of the piston may comprise rubber or any other elastomeric material suitable for isolating the fluid channels 218 and 220. The system may be disposed in the piston chamber 234 of the valve body 222. The piston 236 may have spring 240 disposed at one end of the piston 236. The spring 240 may further abut a cap 242 that may be threadably disposed in the valve body 222 so as to retain the piston 236 and spring 204 in the piston chamber 234 of the valve body 222. In some embodiments, the cap 242 may be vented to atmosphere to permit the spring side of the piston to remain at a substantially constant atmospheric pressure (subject, of course, to elevation changes during vehicle travel). The spring 240 may urge the piston 236 against the opening of fluid channel 220, thus sealing force the channel. The spring 240 may also act to regulate the cracking pressure for the piston valve assembly, while the threaded cap 242 may be utilized to adjust the spring pressure. By advancing the threaded cap 242 against the spring, said spring 240 compresses and thus increases the cracking pressure required to open the piston valve assembly. Loosening the cap 242 has the opposite effect and thus lowers the cracking pressure set point. Alternately, the cracking pressure may not be adjustable in the field and thus the threaded cap 242 would be configured such that the cap 242 cannot be moved after assembly or the cap 242 may be replaced with a solid wall of the valve body 222. In such a configuration, the spring coefficient of the spring mechanism 240 may be the sole regulation for setting the cracking pressure of the piston valve.

Figure 21:
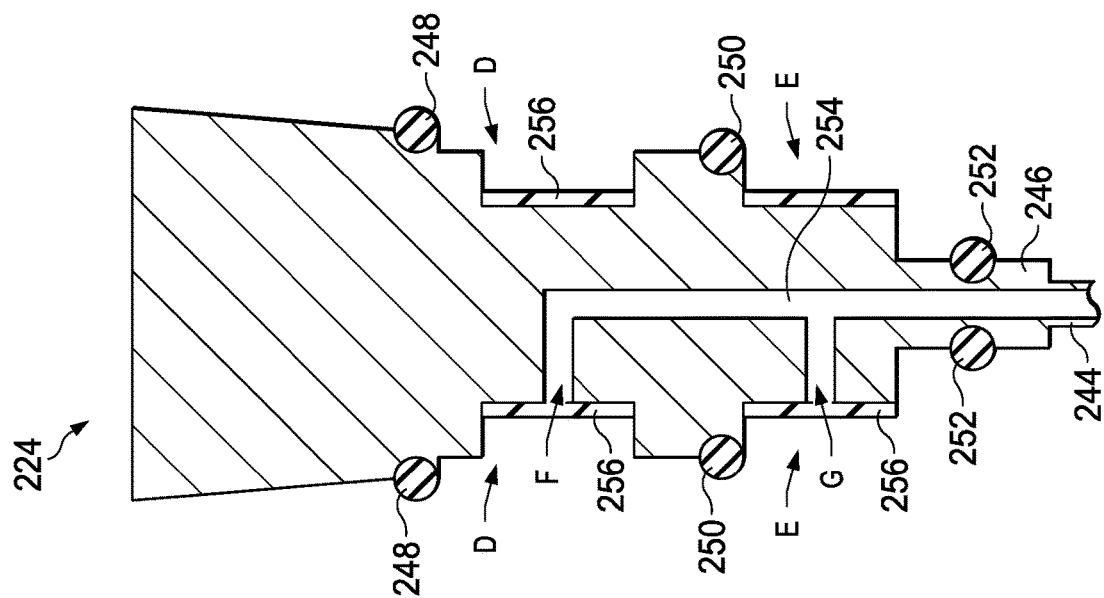
FIG. 21 illustrates an embodiment of the valve core of FIG. 20.

In one embodiment, a valve core 224 as illustrated in section view in FIG. 21 may, when inserted into a cavity 232 of the valve body 222 acts to form sealed pressure chambers D and E corresponding respectively to fluid channels 218 and 220 in the valve body 222. Said chambers D and E may be isolated by means of seals 248 and 250 disposed about the valve core 224 to seal the valve core 224 in the valve body 222. A third seal 252 may be disposed at the supply end of the valve core 224 so as to further seal chamber E. Such a valve core 224 may also have a fluid supply tube 244 forming a rotary union 246 (such as described in connection with FIG. 12, 13 or 14) at the base of the valve core 224. The valve core 224 may have an internal fluid channel 254 such that the supply fluid is delivered to said pressure chambers D and E through ports F and G. Supply fluid may be delivered from chambers D and E to tires in fluid communication therewith through fluid channels (not shown) formed in the valve body 222.

Internal check valves 228 and 230 of the valve assembly 216 may be realized as elastomeric or resilient bands 256 sealingly disposed over the ports F and G of the valve core 224. The bands 256 may be disposed at the valve core ports F and G such that said bands 256 separate the ports F and G from the pressure chambers D and E. The bands 256 may be disposed about the circumference of the valve core 224 at each port F and G and thus at each pressure chamber D and E. Each band 256 may be so constructed as to leave small channels between the body of the valve core 224 and upper and lower edges of the band 256 and thus create a circumferential orifice between the valve core 224 and the top and bottom edges of the band 256.

Figure 22:
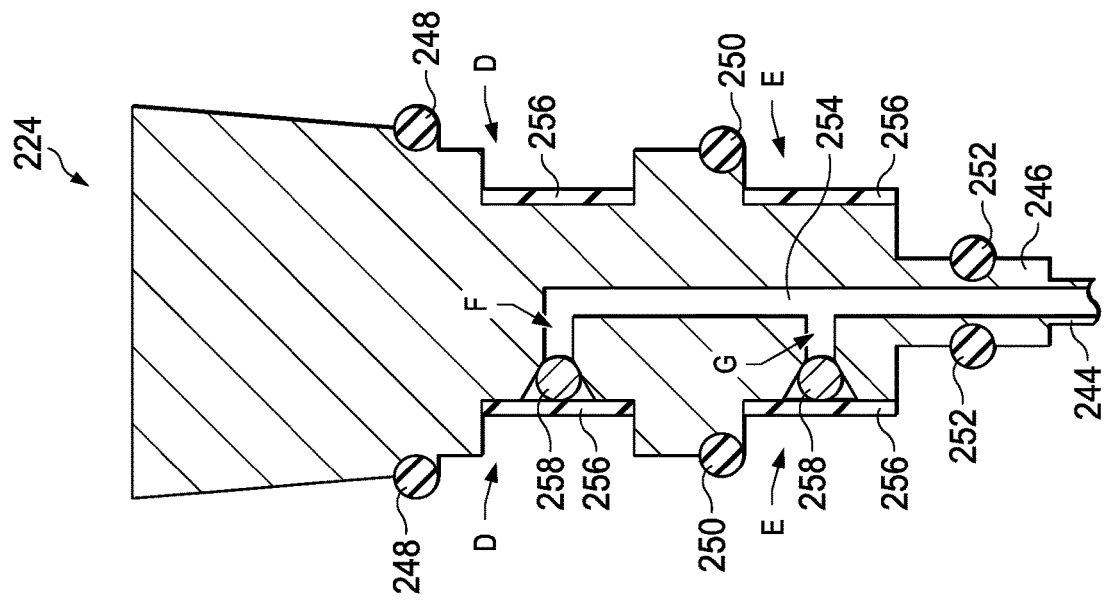
FIG. 22 illustrates another embodiment of the valve core of FIG. 20.

In other embodiments, as in FIG. 22, said check valves 228 and 230 may each comprise a band 256 as above in conjunction with a ball 258. Said ball 258 may disposed at each of the ports F and G of the valve core 224 and configured so as to rest in the mouth of said ports F and G. When a pressurized fluid exits said ports F and G the ball may be forced from the mouth of said ports F and G and retained by the band 256. Any attempt of fluid to enter the ports F and/or G may result in a ball 258 being forced against the mouth of the port F and G, and thus prevent backflow into said port F and/or G. In either configuration, said bands 256 and balls 258 may be of a hard metal, such as aluminum or steel, or may be of an elastomeric material or resilient metal. The balls may seal the ports, but may also serve to support the elastomeric band to prevent fluid pressure from forcing the bands into the ports. As with other components of the system, the bands 256 and balls 258 may need to be resistant to chemicals and forces as typically associated with tire inflation systems.

Figure 23:
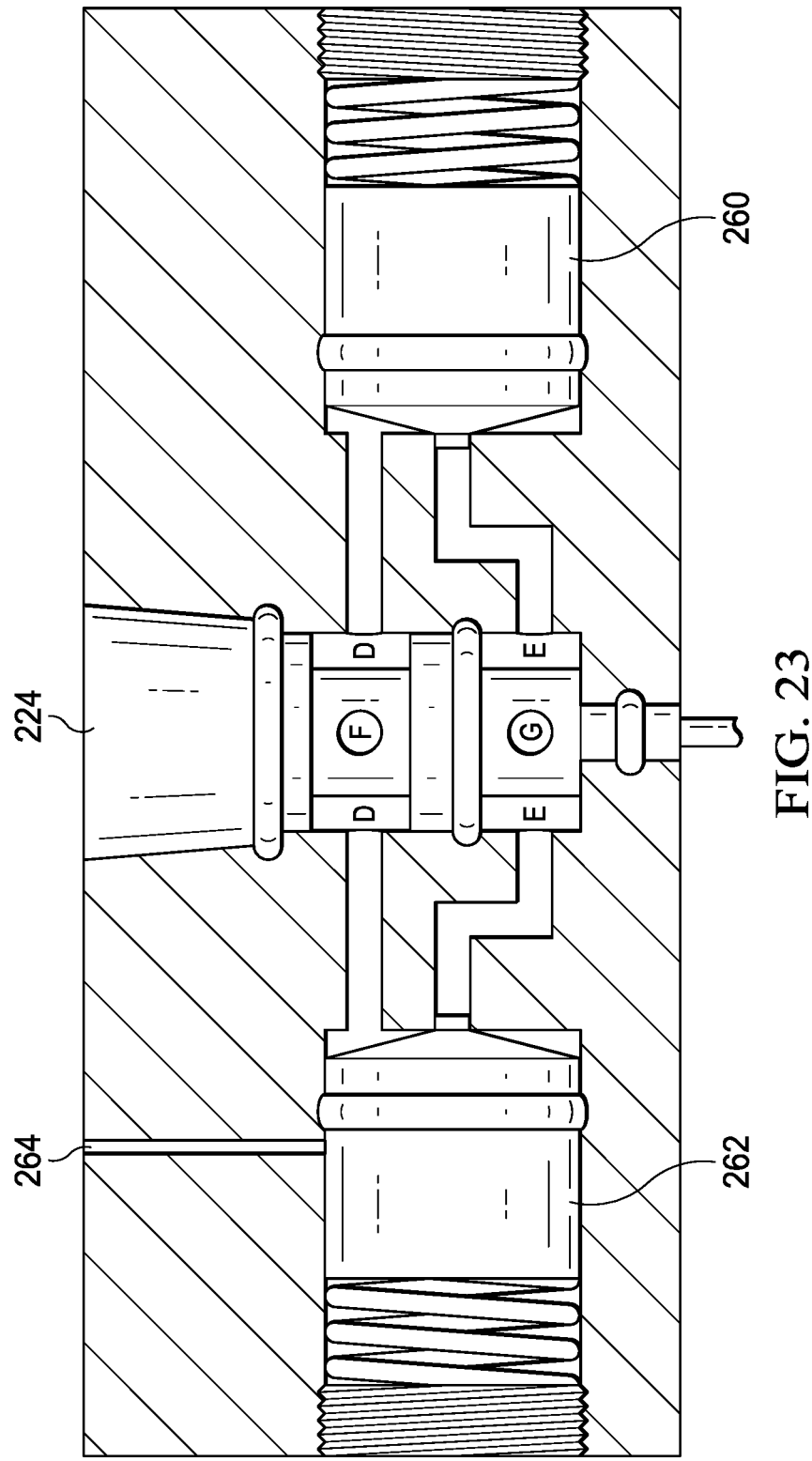
FIG. 23 illustrates still another embodiment of the valve core of FIG. 20.

In yet further embodiments, the invention may maintain both equalization and pressure relief functions as illustrated in FIG. 23. Such an embodiment may function under the same principles as disclosed in the embodiments of FIGS. 7-11. Such an embodiment may replace the diaphragm valves of the referenced disclosures with piston valve actuator as disclosed in previous embodiments. As such, the equalization piston 260 may open at a particular cracking pressure to provide fluid communication between the opposing pressure chambers D and E and the relief piston valve 262 may open at a higher cracking pressure to protect the tires from over-pressurization. The relief piston valve 262 may be in fluid communication with of the fluid chambers D or E, and may vent to the atmosphere through channel 264. In some embodiments, the spring side of piston valve 262 may be vented to atmosphere to permit the spring side of the piston to remain at a substantially constant atmospheric pressure.

Figure 24:
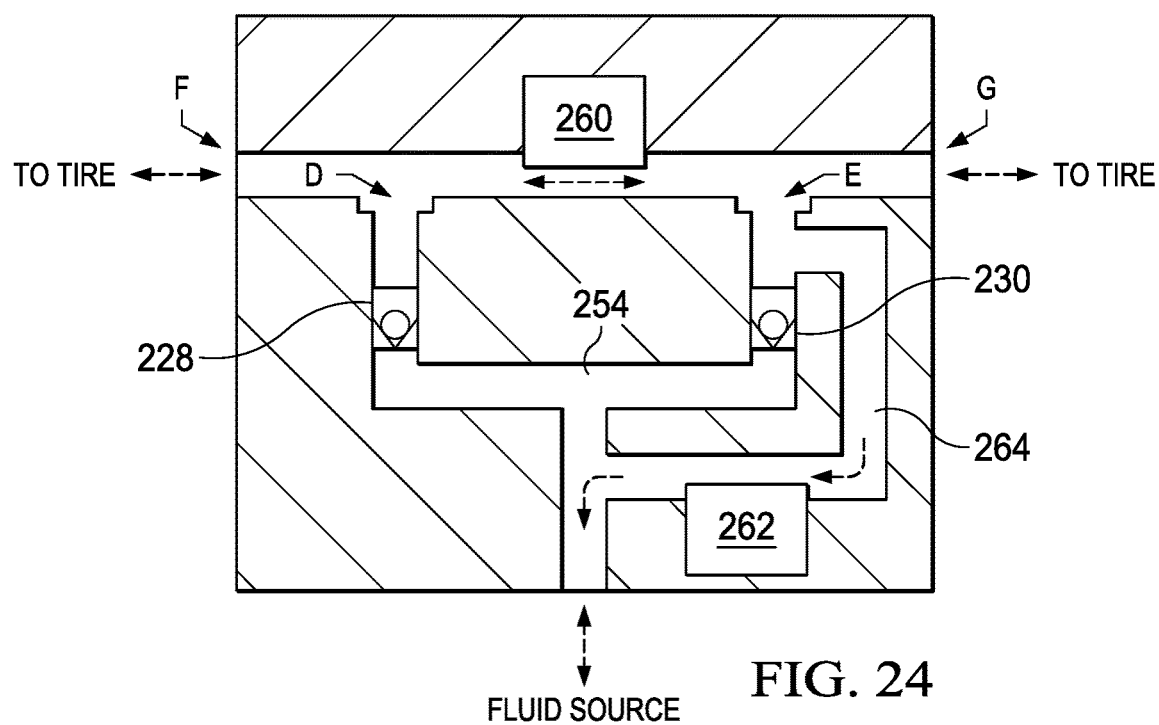
FIG. 24 illustrates another embodiment of a pressure equalization valve assembly having a pressure relief valve.
Figure 25:
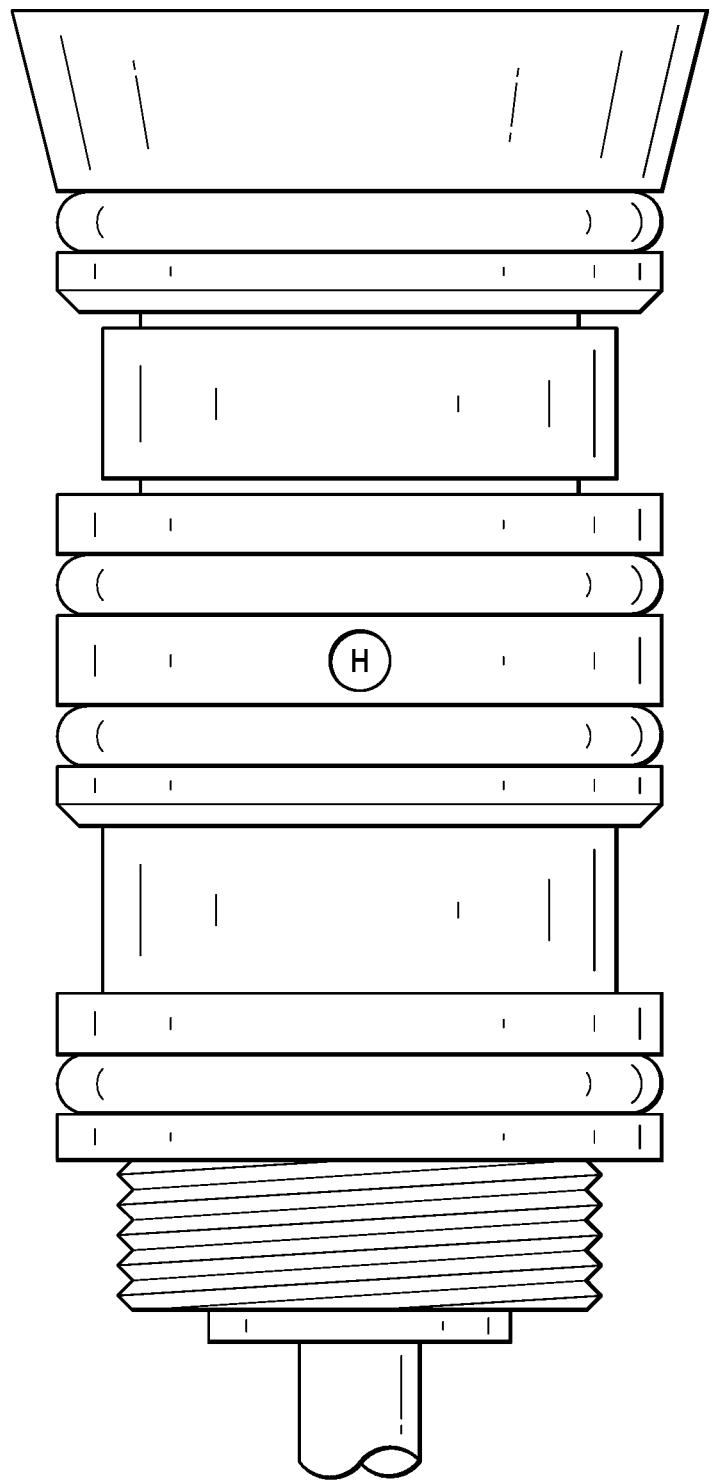
FIG. 25 illustrates a valve core having an exhaust port.

In another embodiment, as in FIGS. 24 and 25, the valve core 222 may be provided with a port H in fluid communication with a pressure relief fluid channel separate from the fluid channel 254 formed therein. In other embodiments, if a pressure regulator includes a pressure relief port, then port H may simply allow excess pressure to travel back through fluid channel 254 toward the fluid pressure source, and be relieved to atmosphere at the pressure regulator. Alternatively, a pressure relief valve may be provided at any point between the pressurized fluid supply and the port H, and excessively pressurized fluid may flow back toward the fluid pressure source, and be relieved to atmosphere at the pressure relieve valve. In other embodiments, the relief piston 262 may be set to crack open at or below the pressure desired for the tires. The port H may be in fluid communication with the PPV 262 to relieve pressure back through the valve core 222 to atmosphere. In some embodiments, the pressure may be relieved back into a vented axle.

Figure 7:
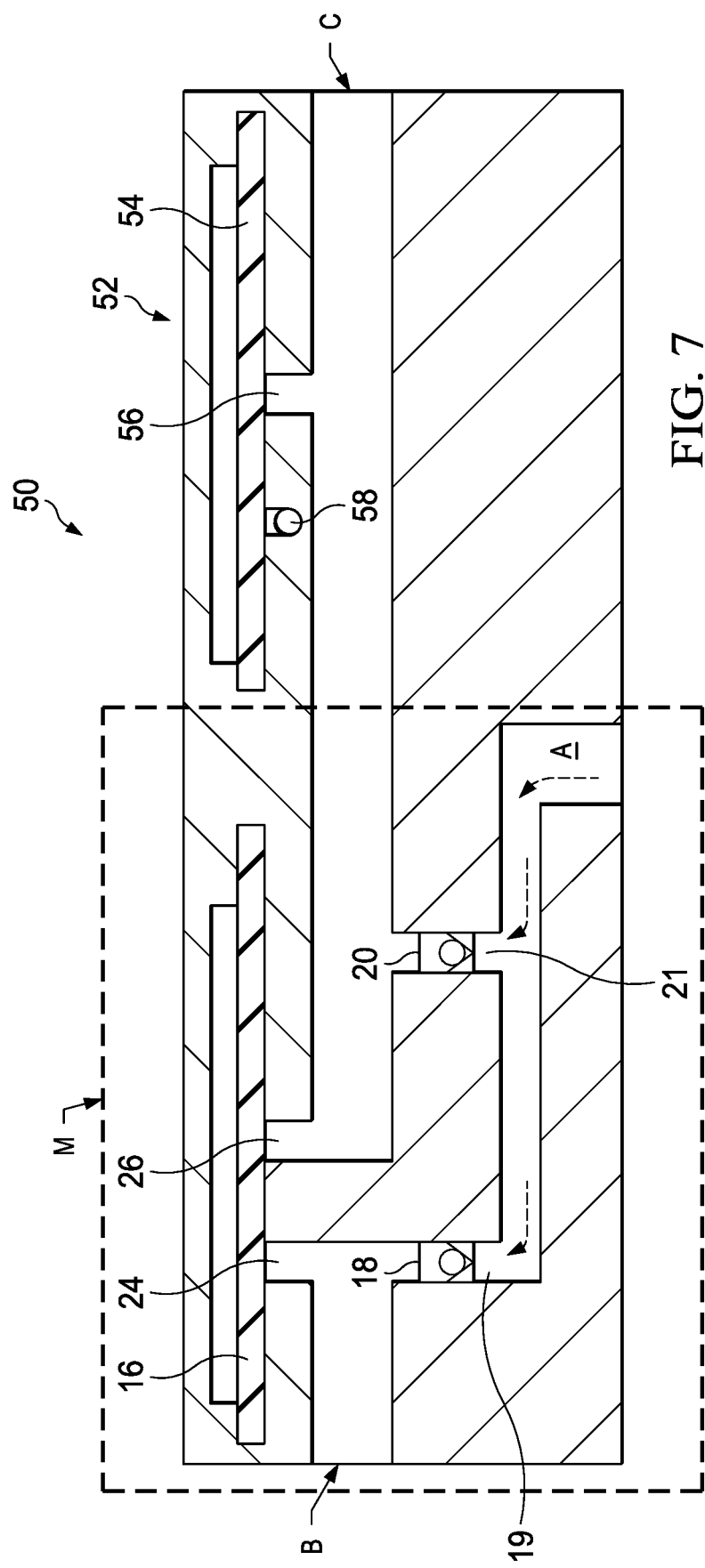
FIG. 7 illustrates one embodiment of a pressure equalization valve assembly having a pressure relief valve.

It will be appreciated that the exhaust port 58 of FIG. 7 may similarly be in fluid communication with the fluid chamber A rather than with atmosphere. Thus, if a pressure regulator includes a pressure relief port, then the exhaust port may simply allow excess pressure to travel back through fluid chamber A toward the fluid pressure source, and be relieved to atmosphere at the pressure regulator. Alternatively, a pressure relief valve may be provided at any point between the pressurized fluid supply and the exhaust port, and excessively pressurized fluid may flow back toward the fluid pressure source, and be relieved to atmosphere at the pressure relieve valve. The exhaust port may be in fluid communication with a pressure protection valve to relieve pressure back through the fluid chamber A to atmosphere.

As may be seen in the conceptualization of FIG. 24, the piston valve 262 may be so disposed as to be in communication with the air supply channel 254 and a single tire associated with a particular port F or G. Under over-pressurization situations, the relief PPV 262 may actuate to allow bidirectional flow between the tire and the air supply channel 254. In the event of over-pressurization of the tire not in the relief loop, excess pressure may be shunted to the tire in the relief loop. If then the tire in the relief loop becomes over-pressurized, the relief PPV 254 may then actuate.

Figure 26:
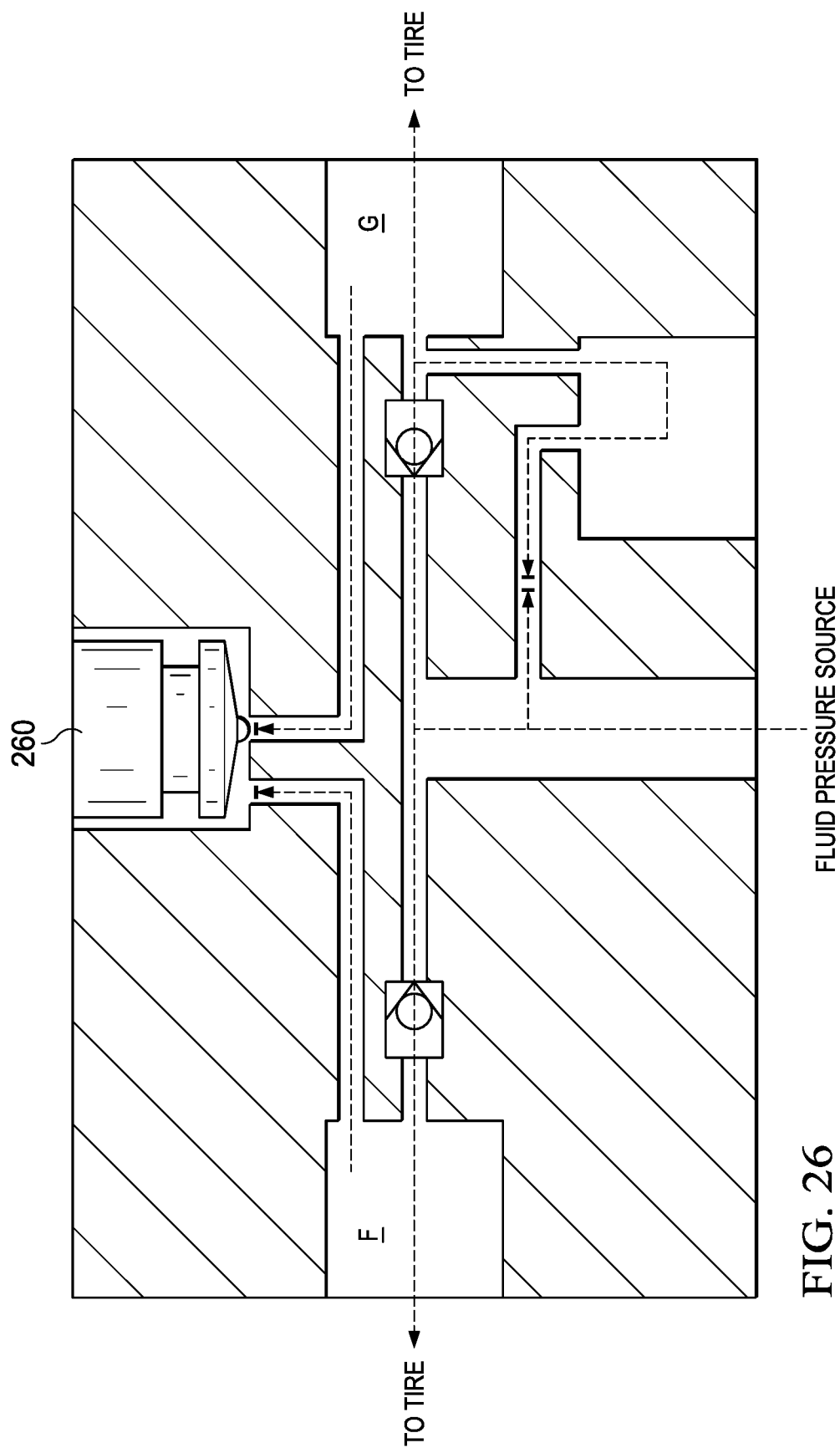
FIG. 26 illustrates an example of fluid flow through a valve assembly.
Figure 27:
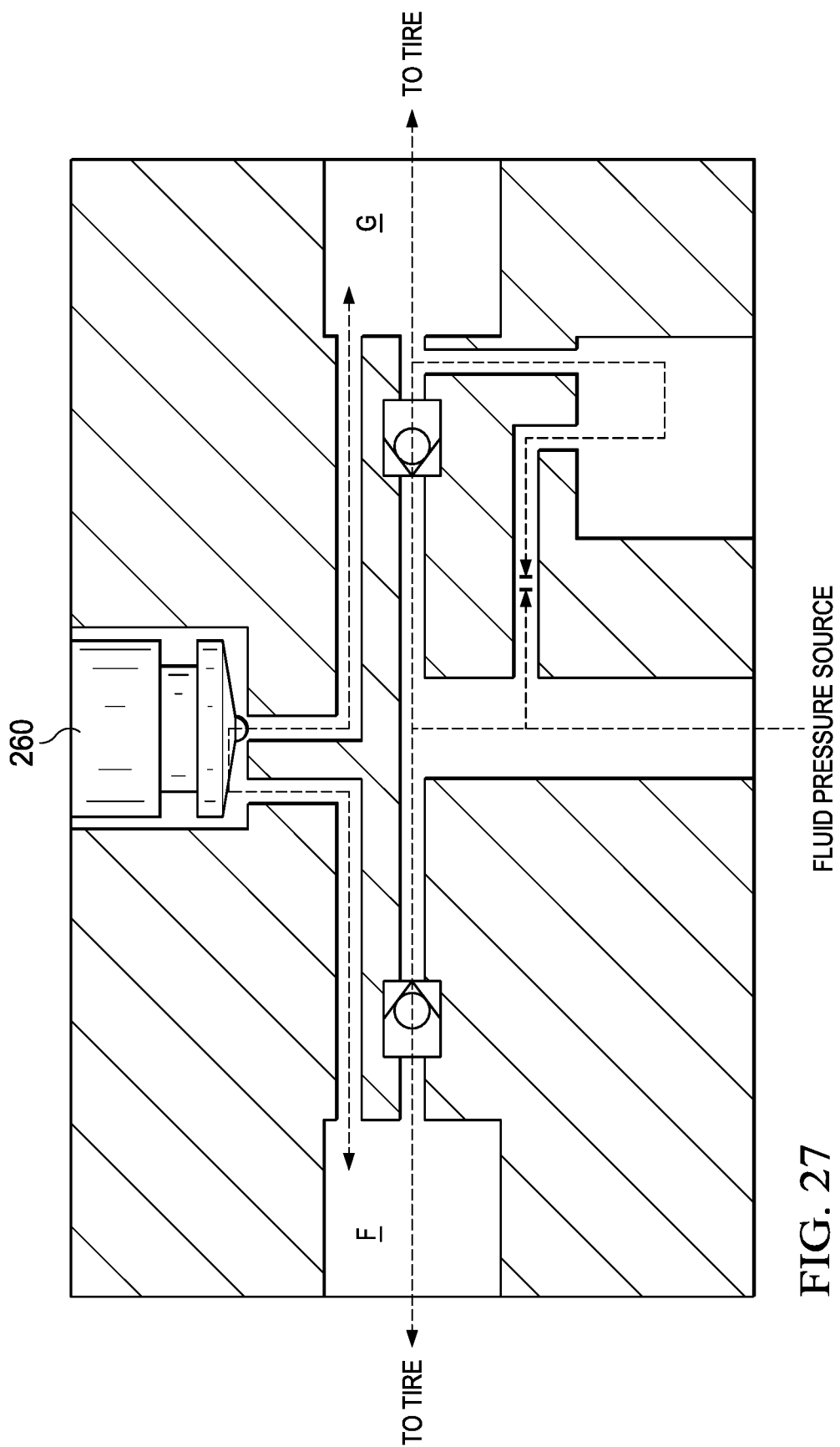
FIG. 27 illustrates another example of fluid flow through a valve assembly.

Thus, in low pressure equalization mode (without a pressure relief valve, fluid may flow to the tires when both tires have low pressure, as seen in the embodiment of FIG. 26. If the tire connected to port F is above equalization level, then the piston valve 260 will open to permit pressure to equalize between ports F and G, and hence between the tires connected respectively thereto, as see in the embodiment of FIG. 27. In FIGS. 26 and 27, the pressure relief valve is omitted for clarity, and may be deemed sealed for purposes of this example.

Figure 28:
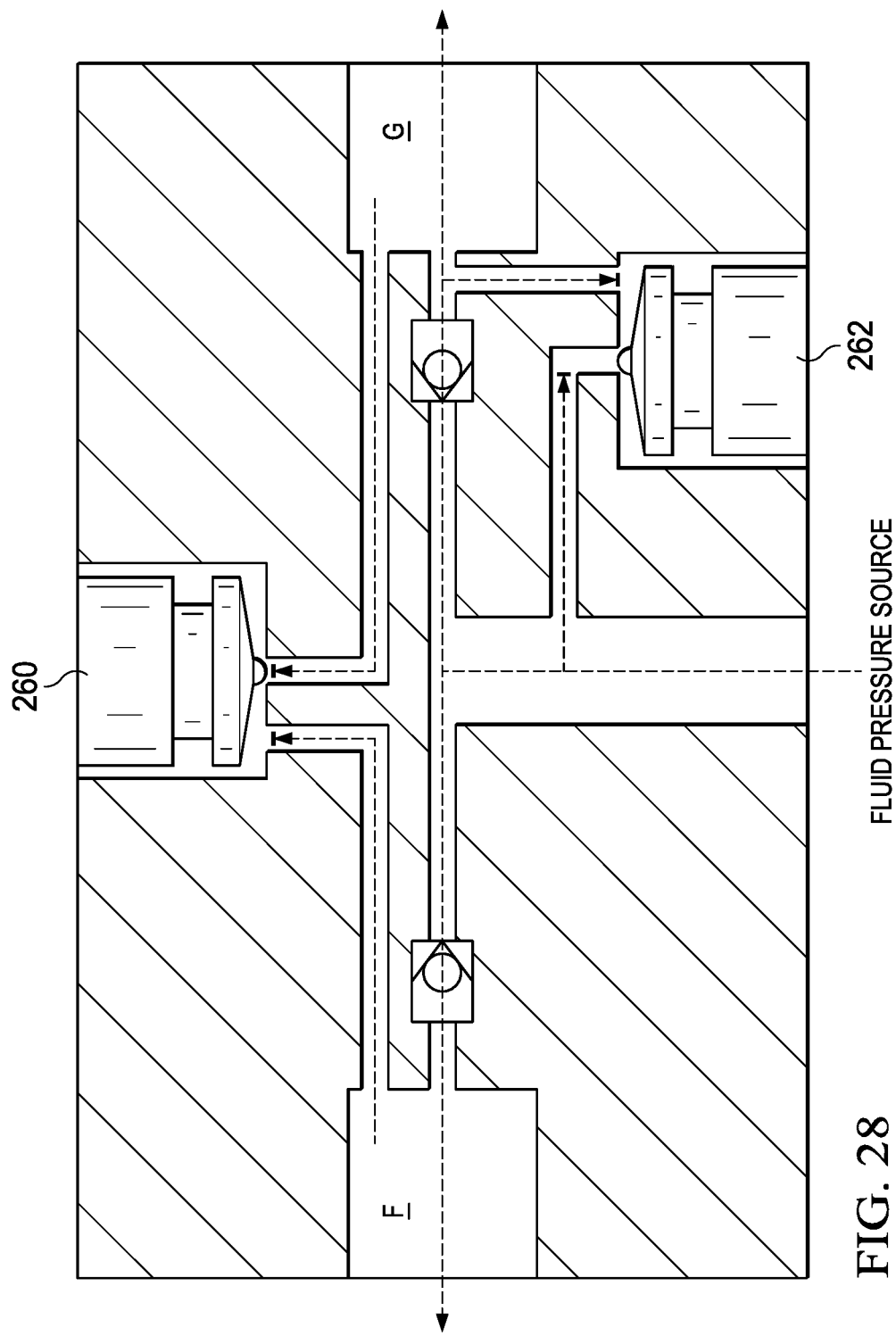
FIG. 28 illustrates a further example of fluid flow through a valve assembly.

In pressure relief mode, if both tires have low pressure, then the piston valve 260 and PPV piston valve 262 will both remain closed, and the pressurized fluid from the fluid supply may inflate the tires, as may be seen in the embodiment of FIG. 28.

Figure 29:
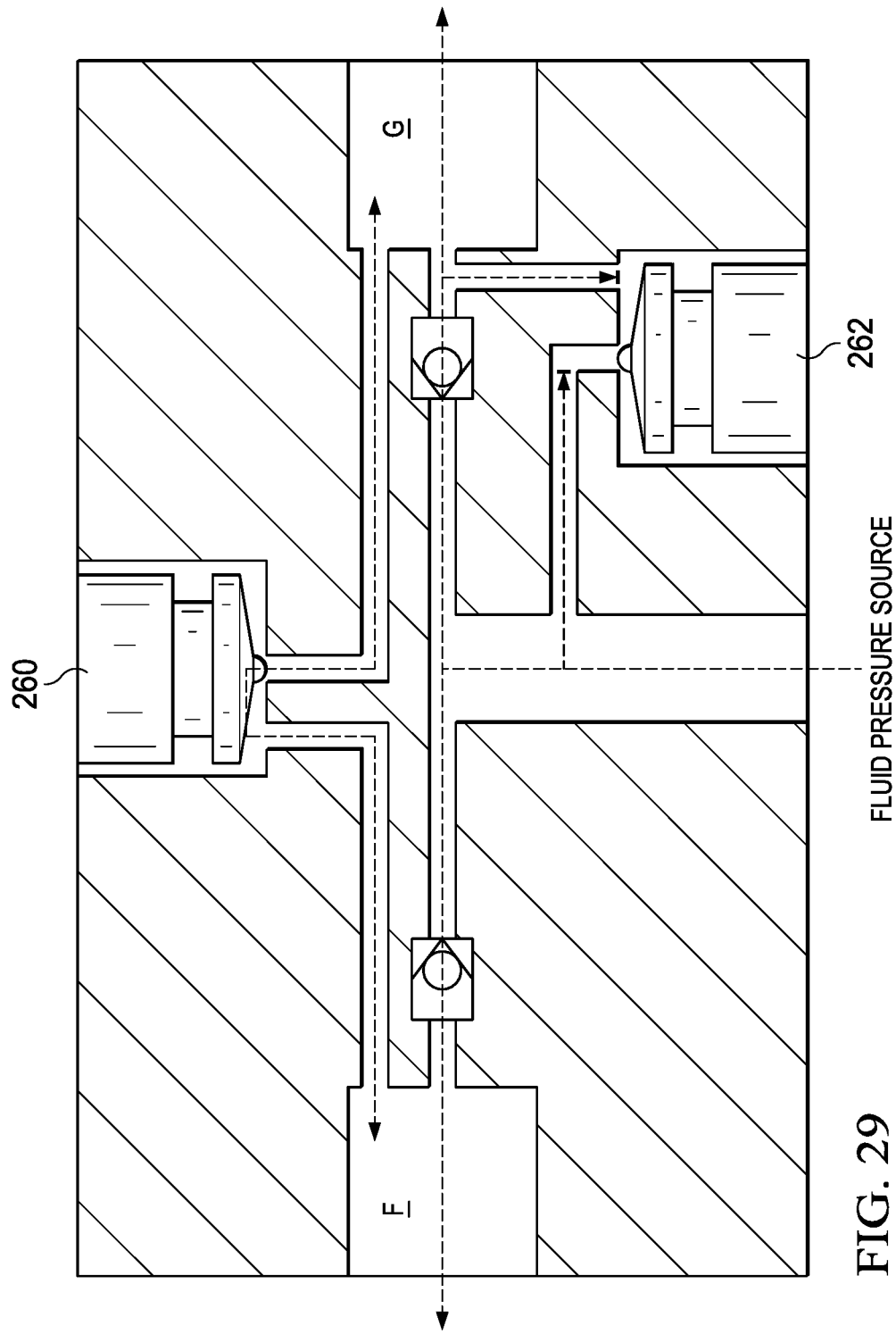
FIG. 29 illustrates yet another example of fluid flow through a valve assembly.

If the pressure in the tire connected to port F is above equalization level, then the piston valve 260 will open to permit pressure to equalize between ports F and G, and hence between the tires connected respectively thereto, as see in the embodiment of FIG. 29. As noted above, in various embodiments, the equalization level may be set lower, at about, or above the pressure of the fluid from the pressure source. PPV piston valve 262 will remain closed if the fluid pressure in ports F and/or G is sufficiently above the pressure of the fluid from the pressure source.

Figure 30:
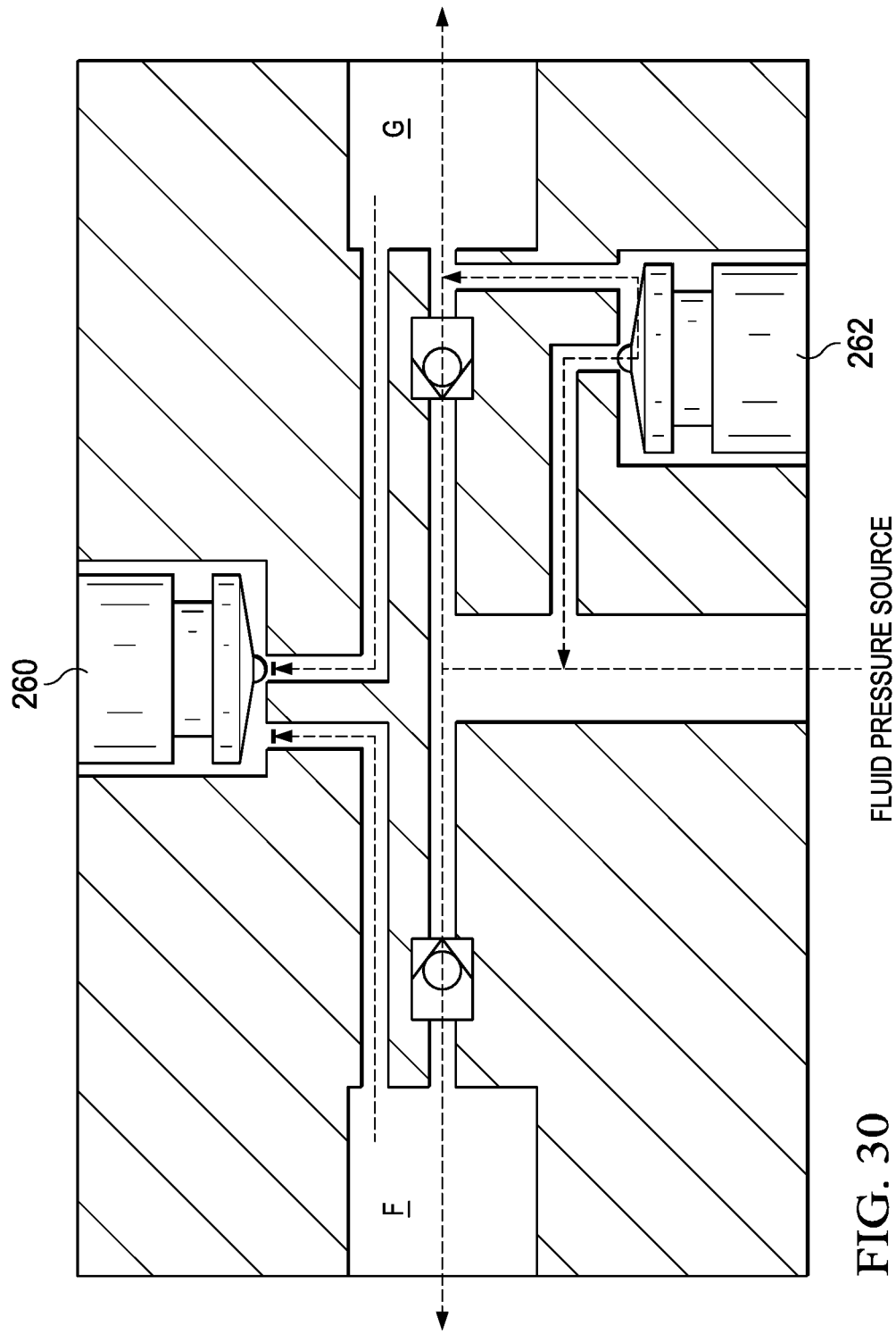
FIG. 30 illustrates another example of fluid flow through a valve assembly.

If the pressure in the tire connected to port G is over-pressurized and thus over the cracking pressure of PPV piston 262, then the PPV piston 262 will open to allow fluid flow back toward the fluid source, as may be seen in the embodiment of FIG. 30.

Figure 31:
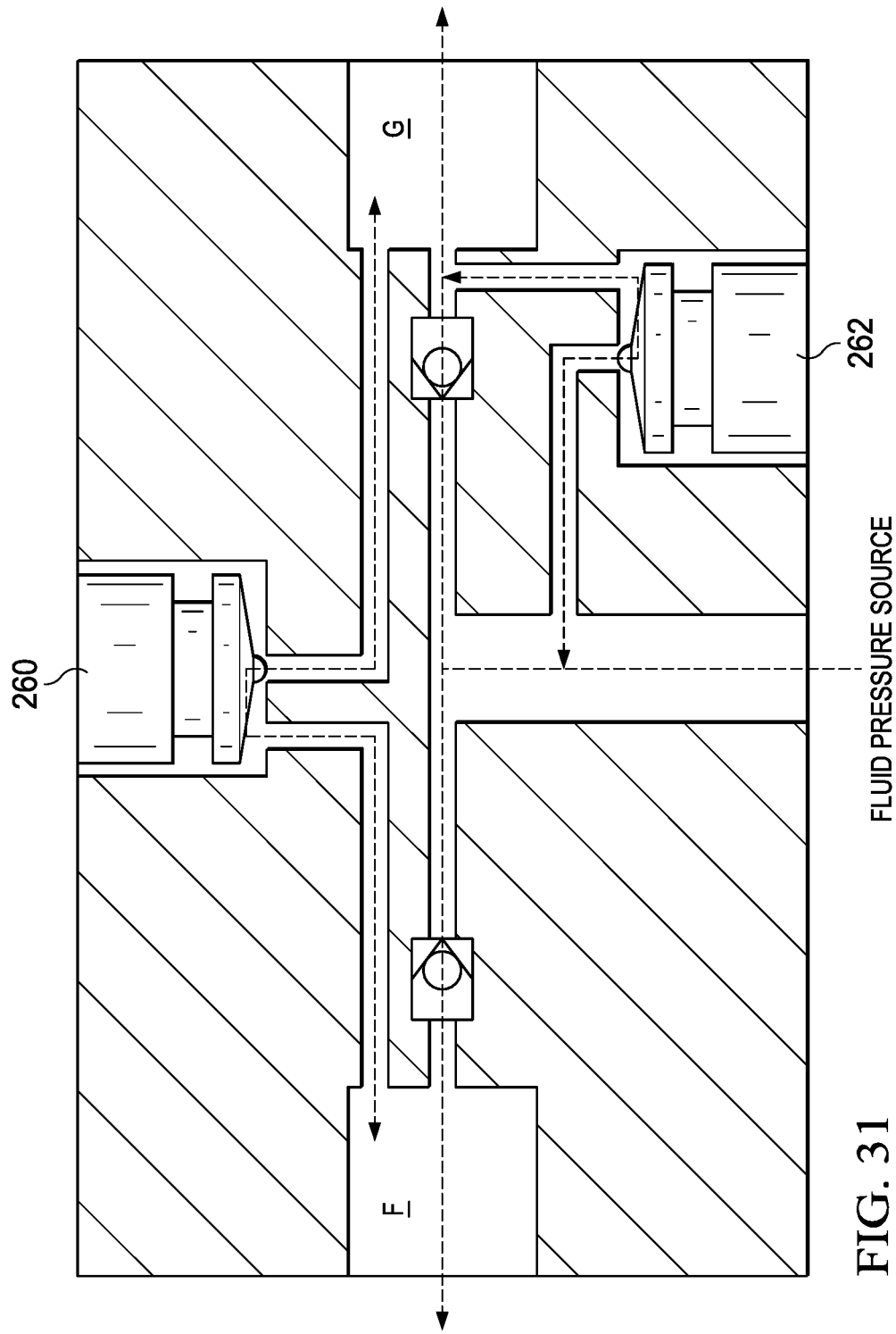
FIG. 31 illustrates yet another example of fluid flow through a valve assembly.

If the tire connected to port G is above both the relief valve 262 cracking pressure and the piston valve 260 cracking pressure, then both of the valves 260 and 262 may open to allow flow between tires A and B, and back to a pressure relief port, as may be seen in FIG. 31.

The foregoing may thus be variously embodied according to the following numbered clauses:

1. A valve assembly comprising a valve body forming fluid chamber configured to receive pressurized fluid from a fluid pressure source, a first port configured for sealed communication with a first vehicle tire, and a second port configured for sealed communication with a second vehicle tire; a first one-way valve disposed in the valve body between the fluid chamber and the first port so as to allow one-way fluid communication from the fluid chamber to the first port when the first one-way valve opens; a second one-way valve disposed in the valve body between the fluid chamber and the second port so as to allow one-way fluid communication from the fluid chamber to the second port when the second one-way valve opens; and a two-way valve disposed in the valve body between the first port and the second port so as to allow two-way fluid communication between the first port and the second port when the two-way valve opens.

2. The assembly of clause 1, wherein the first one-way valve and the second one-way valve are each pneumatically actuatable.

3. The assembly of clause 1, wherein the first one-way valve and the second one-way valve each comprise an elastomeric duck-bill valve.

4. The assembly of clause 1, wherein the first one-way valve and the second one-way valve each comprise a vehicle tire valve.

5. The assembly of clause 1, wherein the two-way valve is pneumatically actuatable.

6. The assembly of clause 1, the first port and the second port each in fluid communication with a first common surface, the two-way valve comprising a first diaphragm disposed against the first common surface so as to substantially seal the first port and second port against fluid flowing therebetween at a first fluid pressure, the diaphragm configured to flex away from the first port and the second port so as to allow fluid to flow in sealed communication therebetween at a second fluid pressure.

7. The assembly of clause 6, further comprising an adjustor disposed to as to allow adjustment of the second fluid pressure at which the diaphragm will flex.

8. The assembly of clause 7, the adjustor comprising an adjustable knob and a spring disposed between the knob and the diaphragm, the knob being configured to adjust the spring load to change the force of the spring against the diaphragm.

9. The assembly of clause 8, the adjustable knob being configured for manual adjustment.

10. The assembly of clause 7, further comprising a wear pad disposed between the spring and the diaphragm.

11. The assembly of clause 6, further comprising a spring disposed against the diaphragm so as to dampen diaphragm vibration.

12. The assembly of clause 8 or 11, the spring comprising one of an elastomeric body, a compression coil and a gas cylinder.

13. The assembly of clause 6, the valve body comprising a first part and a second part having the diaphragm disposed therebetween.

14. The valve assembly of clause 1, further comprising an exhaust port in fluid communication with the atmosphere; and a third one-way valve disposed in the valve body between the exhaust port and either the first port or the second port so as to allow one-way fluid communication from the first port or the second port to the exhaust port when the third one-way valve opens.

15. The valve assembly of clause 14, the exhaust port and the first port or second port in fluid communication with a common surface, the third one-way valve comprising a diaphragm disposed against the common surface so as to substantially seal the exhaust port and the first port or second port against fluid flowing between the exhaust port and the first port or second port at a first fluid pressure, the diaphragm configured to flex away from the exhaust port and the first port or second port so as to allow fluid to flow in sealed communication between the exhaust port and the first port or second port at a second fluid pressure.

16. The valve assembly of clause 6, further comprising an exhaust port in fluid communication with the atmosphere, the exhaust port and the first port or second port in fluid communication with a second common surface; and a second diaphragm disposed in the valve body against the second common surface so as to substantially seal the exhaust port and the first port or second port against fluid flowing between the exhaust port and the first port or second port at third fluid pressure, the second diaphragm configured to flex away from the exhaust port and the first port or second port so as to allow fluid to flow in sealed communication between the exhaust port and the first port or second port at a fourth fluid pressure.

17. The valve assembly of clause 15 or 16, further comprising an adjustor disposed to as to allow adjustment of the fourth fluid pressure at which the second diaphragm will flex.

18. The assembly of clause 17, the adjustor comprising an adjustable knob and a spring disposed between the knob and the second diaphragm, the knob being configured to adjust the spring load to change the force of the spring against the second diaphragm.

19. The assembly of clause 18, the adjustable knob being configured for manual adjustment.

20. The assembly of clause 17, further comprising a wear pad disposed between the spring and the second diaphragm.

21. The assembly of clause 16, further comprising a spring disposed against the second diaphragm so as to dampen second diaphragm vibration.

22. The assembly of clause 18 or 21, the spring comprising one of an elastomeric body, a compression coil and a gas cylinder.

23. The valve assembly of clause 1, further comprising a rotary fluid connection in sealed communication between the fluid chamber and the fluid pressure source.

24. The valve assembly of clause 23, the rotary fluid connection comprising a tube having an end pivotably disposed in the fluid chamber; and an annular seal disposed about the tube so as to provide a pivotable sealing interface between the tube and the fluid chamber.

25. The valve assembly of clause 24, the annular seal comprising an o-ring or a lip seal.

26. The valve assembly of clause 24, the rotary fluid connection comprising a bearing disposed between the end of tube and the fluid chamber.

27. The valve assembly of clause 23, the rotary fluid connection comprising a rigid shaft rotatably and non-pivotably disposed in the fluid chamber; and a bearing non-rotatably disposed between the shaft and the fluid chamber, the interface between the bearing and the shaft forming a fluid face seal.

28. The valve of clause 23, the rotary fluid connection comprising a tube rotatably and non-pivotably disposed in the fluid chamber; and an annular seal disposed about the tube so as to provide a sealing interface between the tube and the fluid chamber.

30. The valve assembly of clause 28, the annular seal comprising an o-ring or a lip seal.

31. The valve assembly of clause 1, further comprising a pressure relief valve in sealed fluid communication between the fluid chamber and the fluid pressure source.

32. The valve assembly of clause 31, the pressure relief valve comprising a dump valve.

33. The valve assembly of clause 32, the dump valve being actuatable upon de-activation of the fluid pressure source.

34. The valve assembly of clause 33, the fluid pressure source comprising a vehicle air brake system, and de-activation comprises either dumping air from the air brakes or turning off vehicle ignition.

35. The valve assembly of clause 1, further comprising a valve core disposed in the valve body and isolating the first port from the second port, the valve core having a first opening corresponding to the first port and a second opening corresponding to the second port, the fluid chamber being formed in the valve core and in sealed fluid communication with the first opening and the second opening; the first one-way valve comprising a first elastomeric band sealingly disposed about the first opening; the second one-way valve comprising a second elastomeric band sealingly disposed about the second opening; and the two-way valve comprising a first piston assembly disposed in the valve body.

36. The valve assembly of clause 35, the first one-way valve further comprising a first ball disposed in the first opening under the first elastomeric band; and the second one-way valve further comprising a second ball disposed in the second opening under the second elastomeric band.

37. The valve assembly of clause 35, the first piston assembly comprising a first piston having an elastomeric nose, the nose sealingly disposed against the first port or the second port; and a first spring disposed in the valve body against the first piston so as to urge the first piston against the first port or the second port.

38. The assembly of clause 37, further comprising an adjustor disposed to as to allow adjustment of the fluid pressure at which the piston will move away from the first port or the second port so as to allow fluid to flow therebetween.

39. The assembly of clause 38, the adjustor comprising an adjustable knob being configured to adjust the spring load to change the force of the spring against the piston.

40. The assembly of clause 39, the adjustable knob being configured for manual adjustment.

41. The assembly of clause 37, the spring comprising one of an elastomeric body, a compression coil and a gas cylinder.

42. The assembly of clause 35, further comprising an exhaust port in fluid communication with the atmosphere; and a third one-way valve comprising a second piston assembly disposed in the valve body between the exhaust port and either the first port or the second port so as to allow one-way fluid communication from the first port or the second port to the exhaust port when the third one-way valve opens.

43. The valve assembly of clause 42, the second piston assembly comprising a second piston having an elastomeric nose, the nose sealingly disposed against the first port or the second port; and a second spring disposed in the valve body against the second piston so as to urge the second piston against the first port or the second port.

44. The valve assembly of clause 35, the valve core further comprising an exhaust port in fluid communication with the fluid chamber; and a third one-way valve comprising a second piston assembly disposed in the valve body between the exhaust port and either the first port or the second port so as to allow one-way fluid communication from the first port or the second port to the exhaust port when the third valve opens.

45. The valve assembly of clause 44, further comprising a pressure relief valve in sealed fluid communication between the fluid chamber and the fluid pressure source, wherein when the third valve opens fluid may flow through the exhaust port to the fluid chamber, and from the fluid chamber to the pressure relief valve.

46. The valve assembly of clause 1 being mounted to the exterior or interior of a vehicle hubcap.

47. The valve assembly of clause 6, wherein the first port communicates with the first common surface at about the center of the first diaphragm surface area, and the second port communicates with the first common surface away from the center of the first diaphragm surface area.

48. The valve assembly of clause 47, wherein the cross-sectional area of the first port is different from the cross-sectional area of the second port.

49. The valve assembly of clause 48, wherein the cross-sectional area of the first port is less than the cross-sectional area of the second port.

50. The valve assembly of clause 48, wherein the cross-sectional area of the first port is greater than the cross-sectional area of the second port.

51. The valve assembly of clause 1, wherein the two-way valve is configured to open at a lower fluid pressure than the first one-way valve and the second one-way valve.

52. The valve assembly of clause 1, wherein the two-way valve is configured to open at a higher fluid pressure than the first one-way valve and the second one-way valve.

53. The valve assembly of clause 1, wherein the two-way valve is configured to open at about the same fluid pressure as the first one-way valve and the second one-way valve.

54. The valve assembly of clause 51, wherein the fluid pressure source provides constant fluid pressure during vehicle operation.

55. The valve assembly of clause 1, further comprising an exhaust port in fluid communication with the fluid chamber; and a third one-way valve disposed in the valve body between the exhaust port and either the first port or the second port so as to allow one-way fluid communication from the first port or the second port to the exhaust port when the third one-way valve opens.

56. The valve assembly of clause 55, further comprising a pressure relief valve in sealed fluid communication between the fluid chamber and the fluid pressure source, wherein when the third valve opens fluid may flow through the exhaust port to the fluid chamber, and from the fluid chamber to the pressure relief valve.

57. A hubcap comprising the valve assembly of any of clauses 1-56.

58. An automatic tire inflation system comprising the valve assembly of any of clauses 1-56.

Although the disclosed subject matter and its advantages have been described in detail, it should be understood that various changes, substitutions and alterations can be made herein without departing from the invention as defined by the appended claims. Moreover, the scope of the claimed subject matter is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

We claim:
1. A valve assembly comprising:
a valve body forming a fluid chamber configured to receive constant pressurized fluid at a desired tire pressure from a fluid pressure source on a vehicle during operation of the vehicle, a first port configured for sealed communication with a first vehicle tire, and a second port configured for sealed communication with a second vehicle tire;
a first one-way valve disposed in the valve body between the fluid chamber and the first port so as to allow one-way fluid communication from the fluid chamber to the first port when the first one-way valve opens;
a second one-way valve disposed in the valve body between the fluid chamber and the second port so as to allow one-way fluid communication from the fluid chamber to the second port when the second one-way valve opens; and
a two-way valve disposed in the valve body between the first port and the second port, the two-way valve being configured to remain closed so as to prevent two-way fluid communication between the first port and the second port at or below a first fluid pressure, and to allow the two-way fluid communication at or above a second fluid pressure, the second fluid pressure greater than the first fluid pressure.

2. The assembly of claim 1, wherein the first one-way valve and the second one-way valve are each pneumatically actuatable.

3. The assembly of claim 1, wherein the first one-way valve and the second one-way valve each comprise an elastomeric duck-bill valve.

4. The assembly of claim 1, wherein the first one-way valve and the second one-way valve each comprise a vehicle tire valve.

5. The assembly of claim 1, wherein the two-way valve is pneumatically actuatable.

6. The assembly of claim 1, the first port and the second port each in fluid communication with a first common surface, the two-way valve comprising a first diaphragm disposed against the first common surface so as to substantially seal the first port and second port against fluid flowing therebetween at the first fluid pressure, the diaphragm configured to flex away from the first port and the second port so as to allow fluid to flow in sealed communication therebetween at the second fluid pressure.

7. The assembly of claim 6, further comprising an adjustor disposed as to allow adjustment of the second fluid pressure at which the diaphragm will flex.

8. The assembly of claim 7, the adjustor comprising an adjustable knob and a spring disposed between the knob and the diaphragm, the knob being configured to adjust a spring load to change a force of the spring against the diaphragm.

9. The assembly of claim 8, the adjustable knob being configured for manual adjustment.

10. The assembly of claim 7, further comprising a wear pad disposed between the spring and the diaphragm.

11. The assembly of claim 6, further comprising a spring disposed against the diaphragm so as to dampen diaphragm vibration.

12. The assembly of claim 6, the valve body comprising a first part and a second part having the diaphragm disposed therebetween.

13. The valve assembly of claim 1, further comprising:
an exhaust port in fluid communication with the atmosphere; and
a third one-way valve disposed in the valve body between the exhaust port and either the first port or the second port so as to allow one-way fluid communication from the first port or the second port to the exhaust port when the third one-way valve opens.

14. The valve assembly of claim 13, the exhaust port and the first port or second port in fluid communication with a common surface, the third one-way valve comprising a diaphragm disposed against the common surface so as to substantially seal the exhaust port and the first port or second port against fluid flowing between the first port and the first port or second port at the first fluid pressure, the diaphragm configured to flex away from the exhaust port and the first port or second port so as to allow fluid to flow in sealed communication between the exhaust port and the first port or second port at the second fluid pressure.

15. The valve assembly of claim 6, further comprising:
an exhaust port in fluid communication with the atmosphere, the exhaust port and the first port or second port in fluid communication with a second common surface; and
a second diaphragm disposed in the valve body against the second common surface so as to substantially seal the exhaust port and the first port or second port against fluid flowing between the exhaust port and the first port or second port at a third fluid pressure, the second diaphragm configured to flex away from the exhaust port and the first port or second port so as to allow fluid to flow in sealed communication between the exhaust port and the first port or second port at a fourth fluid pressure.

16. The valve assembly of claim 15, further comprising an adjustor disposed to as to allow adjustment of the fourth fluid pressure at which the second diaphragm will flex.

17. The assembly of claim 16, the adjustor comprising an adjustable knob and a spring disposed between the knob and the second diaphragm, the knob being configured to adjust a spring load to change a force of the spring against the second diaphragm.

18. The assembly of claim 16, further comprising a wear pad disposed between the spring and the second diaphragm.

19. The assembly of claim 15, further comprising a spring disposed against the second diaphragm so as to dampen second diaphragm vibration.

20. The assembly of claim 1, the first fluid pressure being lower than the desired tire pressure.

21. The assembly of claim 20, the second fluid pressure being equal to or greater than the desired tire pressure.

22. The valve assembly of claim 1, further comprising:
a valve core disposed in the valve body and isolating the first port from the second port, the valve core having a first opening corresponding to the first port and a second opening corresponding to the second port, the fluid chamber being formed in the valve core and in sealed fluid communication with the first opening and the second opening;
the first one-way valve comprising a first elastomeric band sealingly disposed about the first opening;
the second one-way valve comprising a second elastomeric band sealingly disposed about the second opening; and
the two-way valve comprising a first piston assembly disposed in the valve body.

23. The valve assembly of claim 22, the first one-way valve further comprising a first ball disposed in the first opening under the first elastomeric band; and the second one-way valve further comprising a second ball disposed in the second opening under the second elastomeric band.

24. The valve assembly of claim 22, the first piston assembly comprising:
a first piston having an elastomeric nose, the nose sealingly disposed against the first port or the second port; and
a first spring disposed in the valve body against the first piston so as to urge the first piston against the first port or the second port.

* * * * *

UNITED STATES PATENT AND TRADEMARK OFFICE
CERTIFICATE OF CORRECTION

PATENT NO. : 10,933,703 B2
APPLICATION NO. : 16/083420
DATED : March 2, 2021
INVENTOR(S) : Hennig et al.

It is certified that error appears in the above-identified patent and that said Letters Patent is hereby corrected as shown below:

On the Title Page

In the abstract:

Line 2, -forming fluid- should be changed to --forming a fluid--.

In the Specification

In the summary:

Column 1, Line 36, -forming fluid- should be changed to --forming a fluid--.

In the detailed description:

Column 5, Line 16, -thus allow the pressures- should be changed to --thus allowing the pressures--.

Column 7, Line 6, -fluid channels 25 and 26- should be changed to --fluid channels 24 and 26--.

Column 7, Line 32, -valve block 50- should be changed to --valve assembly 50--.

Column 7, Line 38, -diaphragm 16- should be changed to --diaphragm 54--.

Column 8, Lines 31-32, -a face seal 80 may- should be changed to --a face seal 81 may--.

Column 9, Line 10, -chambers A and- should be changed to --chamber A and--.

Column 10, Line 33, -the dump valve 241- should be changed to --the dump valve 214--.

Column 11, Line 1, -drop below- should be changed to --drops below--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,933,703 B2

Column 11, Lines 53-54, -when place in contact of such- should be changed to --when placed in contact with such--.

Column 11, Line 66, -spring 204 in- should be changed to --spring 240 in--.

Column 12, Lines 5-6, -thus sealing force the channel- should be changed to --thus sealing the channel--.

Column 13, Lines 9-10, -piston valve actuator- should be changed to --piston valve actuators--.

Column 13, Line 16, -with of the fluid- should be changed to --with the fluid--.

Column 13, Line 18, -of piston valve 262- should be changed to --of relief piston valve 262--.

Column 13, Line 23, -core 222- should be changed to --core 224--.

Column 13, Line 34, -pressure relieve valve- should be changed to --pressure relief valve--.

Column 13, Line 35, -piston 262- should be changed to --piston valve 262--.

Column 13, Line 37, -PPV 262- should be changed to --relief piston valve 262--.

Column 13, Line 38, -core 222- should be changed to --core 224--.

Column 13, Line 51, -pressure relieve valve- should be changed to --pressure relief valve--.

Column 13, Line 56, -piston valve 262- should be changed to --relief piston valve 262--.

Column 13, Line 57, -air supply channel 254- should be changed to --fluid channel 254--.

Column 13, Line 59, -relief PPV 262- should be changed to --relief piston valve 262--.

Column 13, Lines 60-61, -air supply channel 254- should be changed to --fluid channel 254--.

Column 14, Line 10, -PPV piston valve 262- should be changed to --relief piston valve 262--.

Column 14, Line 18, -see in the embodiment- should be changed to --seen in the embodiment--.

Column 14, Line 21, -PPV piston valve 262- should be changed to --relief piston valve 262--.

Column 14, Lines 25-26, -PPV piston 262, then the PPV piston 262- should be changed to --relief piston valve 262, then the relief piston valve 262--.

Column 14, Lines 29-30, -relief valve 262- should be changed to --relief piston valve 262--.

Column 14, Line 32, -tires A and B- should be changed to --tires connected by the valves--.

Column 16, Line 23, -of tube- should be changed to --of the tube--.

Column 16, Lines 46-47, -deactivation comprises either- should be changed to --deactivation comprising either--.

In the Claims

Column 20, Line 16, Claim 16: -to as to- should be changed to --so as to--.